(12) United States Patent
Kwak

(10) Patent No.: US 9,910,320 B2
(45) Date of Patent: Mar. 6, 2018

(54) DISPLAY DEVICE AND MANUFACTURING METHOD THEREOF

(71) Applicant: SAMSUNG DISPLAY CO., LTD., Yongin-si, Gyeonggi-do (KR)

(72) Inventor: Changhun Kwak, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/397,165

(22) Filed: Jan. 3, 2017

(65) Prior Publication Data

US 2017/0192280 A1    Jul. 6, 2017

(30) Foreign Application Priority Data

Jan. 6, 2016    (KR) .................... 10-2016-0001691

(51) Int. Cl.
| | |
|---|---|
| *G02F 1/1339* | (2006.01) |
| *G02F 1/1333* | (2006.01) |
| *G02F 1/1362* | (2006.01) |
| *G02F 1/1368* | (2006.01) |

(52) U.S. Cl.
CPC ........ *G02F 1/13394* (2013.01); *G02F 1/1368* (2013.01); *G02F 1/133345* (2013.01); *G02F 1/136209* (2013.01); *G02F 1/136227* (2013.01); *G02F 1/136286* (2013.01); *G02F 2001/13396* (2013.01); *G02F 2001/136222* (2013.01); *G02F 2201/123* (2013.01)

(58) Field of Classification Search
CPC ....... G02F 1/13394; G02F 2001/13396; G02F 2001/13398
See application file for complete search history.

(56) References Cited

U.S. PATENT DOCUMENTS

| | | | |
|---|---|---|---|
| 2014/0049717 | A1 | 2/2014 | Kwak et al. |
| 2015/0017869 | A1 | 1/2015 | Kwon et al. |
| 2016/0170273 | A1* | 6/2016 | Lee .................... G02F 1/134309 349/43 |
| 2016/0306210 | A1* | 10/2016 | Oh ....................... G02F 1/13394 |

FOREIGN PATENT DOCUMENTS

| | | |
|---|---|---|
| KR | 1020070105457 A | 10/2007 |
| KR | 1020120014749 A | 2/2012 |
| KR | 1020130013110 A | 2/2013 |

* cited by examiner

*Primary Examiner* — Phu Vu
(74) *Attorney, Agent, or Firm* — Cantor Colburn LLP

(57) ABSTRACT

A display device includes a base substrate, a first color filter on the base substrate, the first color filter extending in a direction, a plurality of second color filters on the base substrate, the plurality of second color filters being adjacent to the first color filter, a passivation layer on the base substrate, the first color filter, and the plurality of second color filters, a light blocking portion on the passivation layer, a main column spacer protruding from the light blocking portion, and a sub-column spacer spaced apart from the main column spacer and protruding from the light blocking portion where the main column spacer overlaps the first color filter, and the sub-column spacer is disposed between two of the plurality of second color filters that are adjacent to each other.

16 Claims, 15 Drawing Sheets

DISPLAY DEVICE AND MANUFACTURING METHOD THEREOF

This application claims priority to Korean Patent Application No. 10-2016-0001691, filed on Jan. 6, 2016, and all the benefits accruing therefrom under 35 U.S.C. § 119, the content of which in its entirety is herein incorporated by reference.

BACKGROUND

1. Field

Exemplary embodiments of the invention relate to a display device and a manufacturing method thereof, and more particularly, to a display device including a main column spacer and a sub-column spacer that include the same material and have a step difference and to a manufacturing method thereof.

2. Description of the Related Art

A display device is classified into a liquid crystal display ("LCD") device, an organic light emitting diode ("OLED") display device, a plasma display panel ("PDP") device, an electrophoretic display ("EPD") device, and the like, based on a light emitting scheme thereof.

Such an LCD device generally includes a display substrate including a pixel electrode, an opposing substrate opposing the display substrate, and a liquid crystal layer between the display substrate and the opposing substrate. In recent times, a color filter on array ("COA") structure is being applied to the LCD device, in which a color filter is formed on the display substrate.

In addition, in order to prevent misalignment in a process of coupling the display substrate and the opposing substrate, a black matrix on array ("BOA") structure is being applied to the LCD device, in which a light blocking portion is disposed on the display substrate. Further, in order to simplify the process, a black column spacer structure is being employed, in which a column spacer which maintains a uniform cell gap between the two substrates, includes the same material as that of the light blocking layer and is unitary with the light blocking layer.

SUMMARY

Exemplary embodiments of the invention are directed to a display device including a main column spacer and a sub-column spacer that includes a high degree of pattern accuracy and to a method of manufacturing the display device.

According to an exemplary embodiment of the invention, a display device includes a base substrate, a first color filter on the base substrate, the first color filter extending in a direction, a plurality of second color filters on the base substrate, the plurality of second color filters being adjacent to the first color filter, a passivation layer on the base substrate, the first color filter, and the plurality of second color filters, a light blocking portion on the passivation layer, a main column spacer protruding from the light blocking portion, and a sub-column spacer spaced apart from the main column spacer and protruding from the light blocking portion. The main column spacer overlaps the first color filter, and the sub-column spacer is disposed between two of the plurality of second color filters that are adjacent to each other.

In an exemplary embodiment, the passivation layer may include a convex portion above the first color filter and the plurality of second color filters, and a concave portion among the plurality of second color filters. The sub-column spacer may be disposed above the concave portion.

In an exemplary embodiment, the main column spacer and the sub-column spacer may have substantially the same thickness with respect to portions of a surface of the light blocking portion that are adjacent to the main column spacer and the sub-column spacer, respectively.

In an exemplary embodiment, the main column spacer may have a greater height than a height of the sub-column spacer with respect to a surface of the base substrate.

In an exemplary embodiment, the light blocking portion may include the same material as that included in the main column spacer and the sub-column spacer.

In an exemplary embodiment, the sub-column spacer may not overlap the plurality of second color filters.

In an exemplary embodiment, the display device may further include a gate line on the base substrate, a data line on the base substrate, the data line intersecting the gate line, a thin film transistor ("TFT") connected to the gate line and the data line, and a pixel electrode connected to the TFT. The passivation layer may be disposed above the gate line, the data line, and the TFT, and the pixel electrode may be disposed above the passivation layer.

In an exemplary embodiment, the first color filter may overlap the gate line, and the plurality of second color filters may not overlap the gate line.

In an exemplary embodiment, the first color filter may overlap the data line, and the plurality of second color filters may not overlap the data line.

In an exemplary embodiment, the first color filter may overlap the TFT, and the plurality of second color filters may not overlap the TFT.

In an exemplary embodiment, the light blocking portion may have a recessed portion which is spaced apart from the sub-column spacer and defined in the concave portion.

In an exemplary embodiment, the display device may further include an opposing base substrate disposed to oppose the base substrate, and a liquid crystal layer between the base substrate and the opposing base substrate.

According to another exemplary embodiment, a method of manufacturing a display device includes forming a first color filter and a plurality of second color filters on a base substrate, forming a passivation layer on the first color filter and the plurality of second color filters, and forming a light blocking portion, a main column spacer, and a sub-column spacer on the passivation layer. The first color filter extends in a direction to be disposed on the base substrate, the plurality of second color filters are disposed on the base substrate to be adjacent to the first color filter, the main column spacer overlaps the first color filter, and the sub-column spacer is disposed between two of the plurality of second color filters that are adjacent to each other.

In an exemplary embodiment, the first color filter may be unitary to continuously extend in the direction.

In an exemplary embodiment, the forming the light blocking portion, the main column spacer, and the sub-column spacer may include coating a photosensitive composition forming a light blocking portion on the passivation layer, disposing an exposure mask on the photosensitive composition and irradiating light to the photosensitive composition forming the light blocking portion through the exposure mask, and developing and curing the photosensitive composition forming the light blocking portion that is exposed. The exposure mask may include a transmissive pattern, a semi-transmissive pattern, and a blocking pattern.

In an exemplary embodiment, the transmissive pattern of the exposure mask may be disposed above an area to be formed with the main column spacer and the sub-column spacer.

The foregoing is illustrative only and is not intended to be in any way limiting. In addition to the illustrative exemplary embodiments, and features described above, further exemplary embodiments, and features will become apparent by reference to the drawings and the following detailed description.

BRIEF DESCRIPTION OF THE DRAWINGS

The above and other features and exemplary embodiments of the invention of invention will be more clearly understood from the following detailed description taken in conjunction with the accompanying drawings, in which.

DETAILED DESCRIPTION

Figure 1:
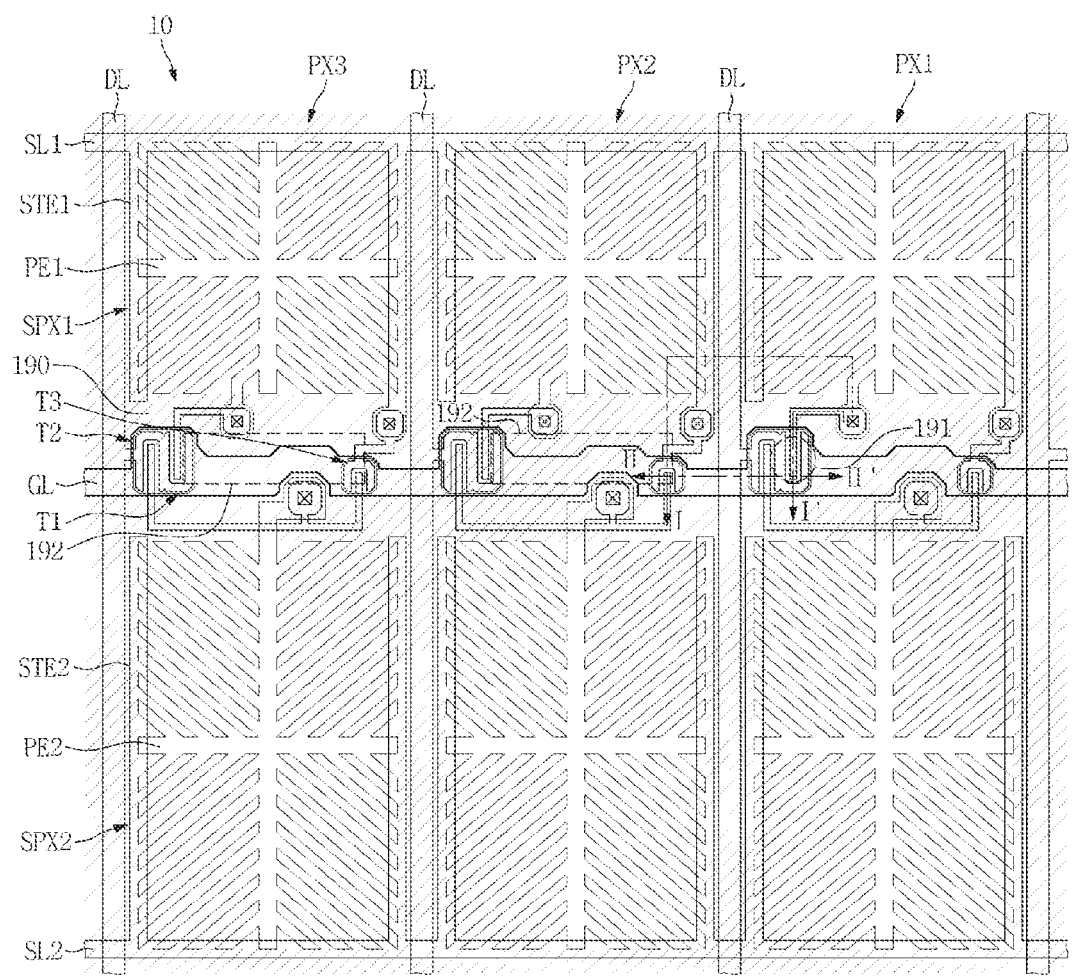
FIG. 1 is a plan view illustrating an exemplary embodiment of a display device.

Exemplary embodiments will now be described more fully hereinafter with reference to the accompanying drawings. Although the invention can be modified in various manners and have several embodiments, exemplary embodiments are illustrated in the accompanying drawings and will be mainly described in the specification. However, the scope of the invention is not limited to the exemplary embodiments and should be construed as including all the changes, equivalents, and substitutions included in the spirit and scope of the invention.

In the drawings, certain elements or shapes may be illustrated in an enlarged manner or in a simplified manner to better illustrate the invention, and other elements in an actual product may also be omitted. Thus, the drawings are intended to facilitate the understanding of the invention.

When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Some of the parts which are not associated with the description may not be provided in order to specifically describe embodiments of the invention, and like reference numerals refer to like elements throughout the specification.

Hereinafter, an exemplary embodiment of a display device will be described in detail with reference to FIGS. 1, 2, 3, 4, 5, and 6.

Figure 2:
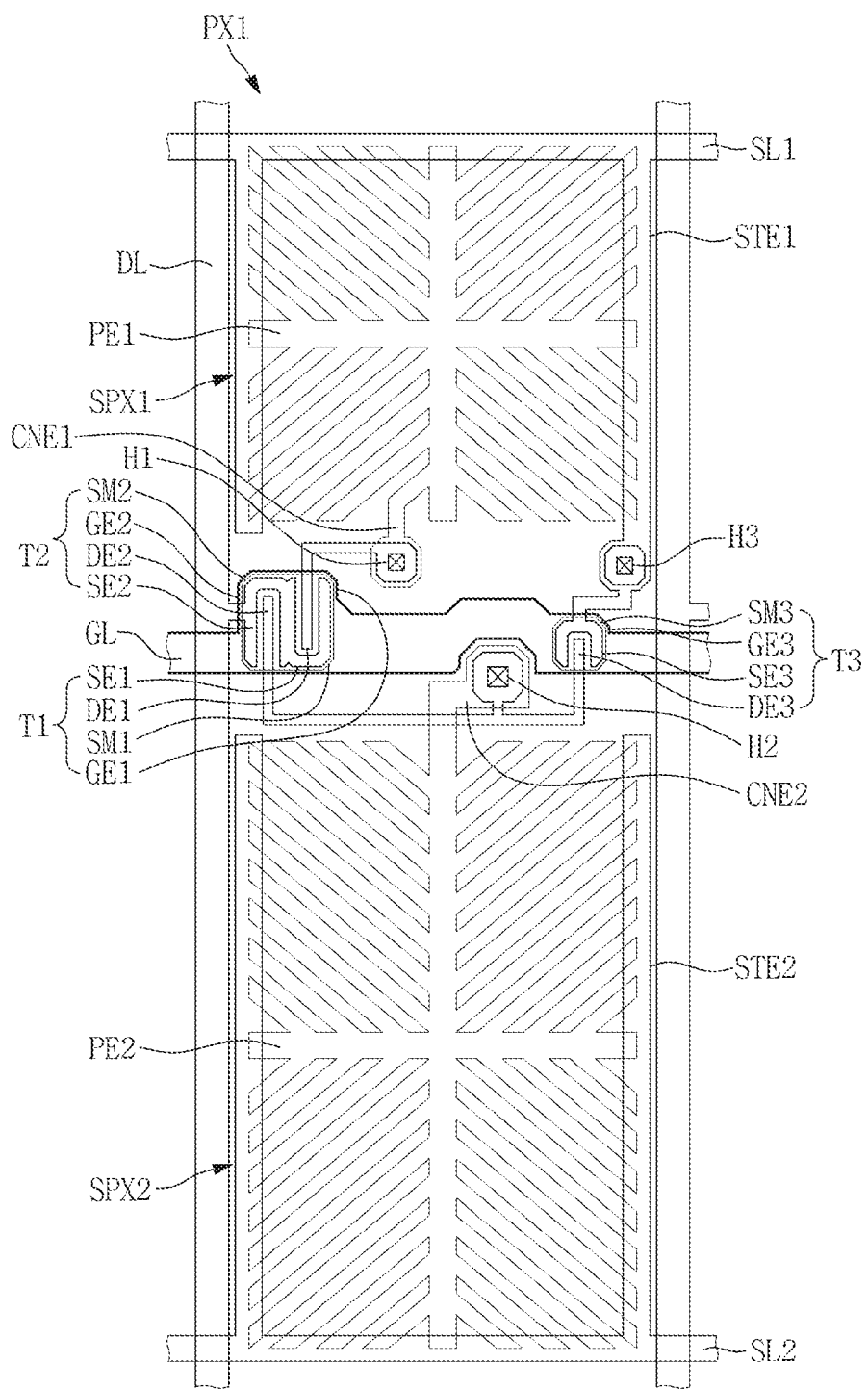
FIG. 2 is a plan view illustrating an exemplary embodiment of a pixel of FIG. 1.
Figure 3:
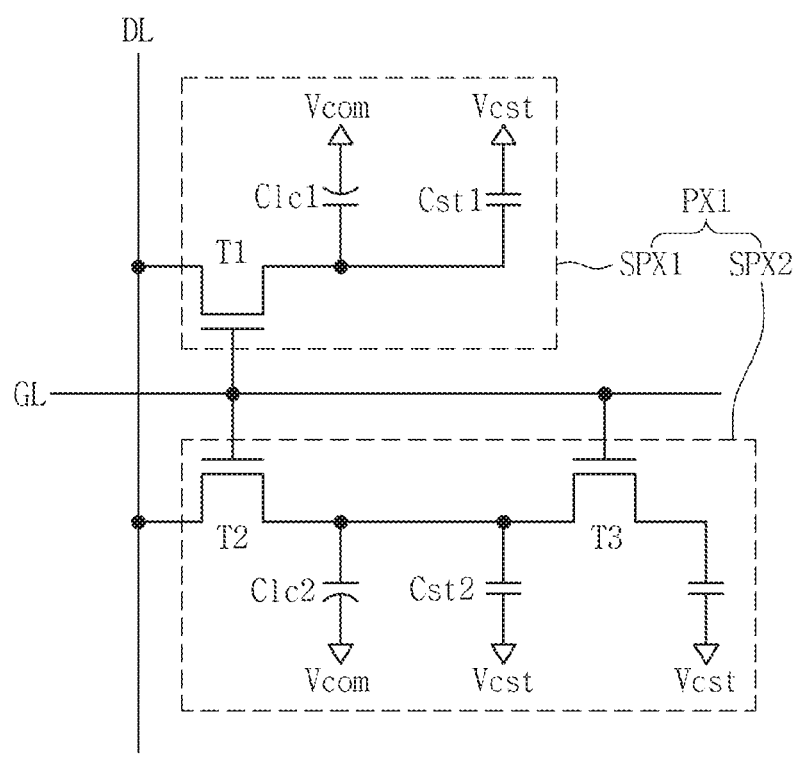
FIG. 3 is an equivalent circuit diagram of the pixel of FIG. 2.

FIG. 1 is a plan view illustrating an exemplary embodiment of a display device, FIG. 2 is a plan view illustrating an exemplary embodiment of a pixel of FIG. 1, and FIG. 3 is an equivalent circuit diagram of the pixel of FIG. 2.

The exemplary embodiment of the display device is a liquid crystal display ("LCD") device 10. Referring to FIGS. 1, 2, 3, 4, 5, and 6, the LCD device 10 includes a plurality of pixels PX1, PX2, and PX3. Hereinafter, the configuration of the pixel will be described with respect to a single pixel, for example, a pixel PX1.

Referring to FIGS. 1 and 2, the pixel PX1 is connected to a gate line GL and a data line DL. The data line DL extends in a first direction, and the gate line GL extends in a second direction. In FIGS. 1 and 2, the first direction refers to a longitudinal direction, and the second direction refers to a transverse direction.

The pixel PX1 includes a first sub-pixel SPX1 and a second sub-pixel SPX2. The first sub-pixel SPX1 includes a first thin film transistor ("TFT") T1, a first pixel electrode PE1, and a first storage electrode STE1. The second sub-pixel SPX2 includes a second TFT T2, a second pixel electrode PE2, a second storage electrode STE2, and a third TFT T3.

The first sub-pixel SPX1 may be also referred to as a high pixel, and the second sub-pixel SPX2 may be also referred to as a low pixel.

In FIG. 1, the gate line GL and the first, second, and third TFTs T1, T2, and T3 are disposed in a border area between the first pixel electrode PE1 and the second pixel electrode PE2 that are adjacent to each other. The data line DL is disposed in border areas among the first sub-pixels SPX1 and among the second sub-pixels SPX2. The gate line GL intersects the data line DL.

The first TFT T1 of the first sub-pixel SPX1 includes a first gate electrode GE1 branching off from the gate line GL, a first semiconductor layer SM1 overlapping the first gate electrode GE1, a first source electrode SE1 branching off from the data line DL and overlapping the first semiconductor layer SM1, and a first drain electrode DE1 spaced apart from the first source electrode SE1 and overlapping the first semiconductor layer SM1. The first drain electrode DE1 is connected to the first pixel electrode PE1. In detail, the first drain electrode DE1 extends toward the first pixel electrode PE1 and is electrically connected to a first connecting electrode CNE1 which branches off from the first pixel electrode PE1 through a first contact hole H1.

The first storage electrode STE1 is connected to a first storage line SL1 which extends in a second direction. The first pixel electrode PE1 partially overlaps the first storage line SL1 and the first storage electrode STE1, thus forming a first storage capacitor Cst1. The first storage electrode STE1 receives a storage voltage Vcst.

The second TFT T2 of the second sub-pixel SPX2 includes a second gate electrode GE2 branching off from the gate line GL, a second semiconductor layer SM2 overlapping the second gate electrode GE2, a second source electrode SE2 branching off from the data line DL and overlapping the second semiconductor layer SM2, a second drain electrode DE2 spaced apart from the second source electrode SE2 and overlapping the second semiconductor layer SM2. The second drain electrode DE2 is connected to the second pixel electrode PE2. In an exemplary embodiment, the second drain electrode DE2 extends toward the second pixel electrode PE2, and is electrically connected to a second connecting electrode CNE2 which branches off from the second pixel electrode PE2 through a second contact hole H2, for example.

The third TFT T3 of the second sub-pixel SPX2 includes a third gate electrode GE3 branching off from the gate line GL, a third source electrode SE3 electrically connected to the first storage electrode STE1 through a third contact hole H3, a third drain electrode DE3 extending from the second drain electrode DE2 and a third semiconductor layer SM3. The third source electrode SE3 and the first storage electrode STE1 are electrically connected to each other through the third contact hole H3. In addition, the third drain electrode DE3 is electrically connected to the second pixel electrode PE2 through the second contact hole H2.

In an alternative exemplary embodiment, the third gate electrode GE3 may branch off from a separate decompression gate line (not illustrated).

The second storage electrode STE2 is connected to the second storage line SL2 that extends in the second direction. The second pixel electrode PE2 overlaps portions of the second storage line SL2 and the second storage electrode STE2, thus forming a second storage capacitor Cst2. The second storage electrode STE2 receives the storage voltage Vcst.

In an exemplary embodiment, the first TFT T1 may have the same size as that of the second TFT T2. In an exemplary embodiment, the third TFT T3 may have a smaller size than that of the second TFT T2.

Hereinafter, an operation of a pixel will be described with reference to FIG. 3. FIG. 3 is an equivalent circuit diagram illustrating the pixel PX1 of FIG. 2. The pixels PX1, PX2, and PX3 illustrated in FIG. 1 may be driven in the same manner.

Referring to FIG. 3, the first, second, and third TFTs T1, T2, and T3 are turned on by the gate signal applied through the gate line GL.

A data voltage is applied to the first sub-pixel SPX1 through the first TFT T1 that is turned on. In an exemplary embodiment, the data voltage applied through the data line DL is applied to the first pixel electrode PE1 (refer to FIGS. 1 and 2) of the first sub-pixel SPX1 through the first TFT T1 that is turned on, for example.

A first pixel voltage corresponding to the data voltage is charged to the first liquid crystal capacitor Clc1. In an exemplary embodiment, the first pixel voltage corresponding to a voltage level difference between the data voltage applied to the first pixel electrode PE1 and a common voltage Vcom is charged to the first liquid crystal capacitor Clc1, for example. Accordingly, the first pixel voltage is charged to the first sub-pixel SPX1.

The data voltage is applied to the second sub-pixel SPX2 through the second TFT T2 that is turned on, and the storage voltage Vcst is applied to the second sub-pixel SPX2 through the third TFT T3 that is turned on.

A range of a voltage level of the data voltage is set to be wider than that of the storage voltage Vcst. The common voltage Vcom may be set to have an intermediate value in the range of the voltage level of the data voltage. An absolute value of a voltage level difference between the data voltage and the common voltage Vcom may be set to be greater than an absolute value of a voltage level difference between the storage voltage Vcst and the common voltage Vcom.

A voltage of a contact point between the second TFT T2 and the third TFT T3 is a voltage divided by resistance values of resistance states when the second TFT T2 and the third TFT T3 are turned on. That is, the voltage of the contact point between the second TFT T2 and the third TFT T3 has a voltage level of about an intermediate value between the data voltage applied through the second TFT T2 that is turned on and the storage voltage Vcst applied through the third TFT T3 that is turned on. The voltage of the contact point between the second TFT T2 and the third TFT T3 is applied to the second pixel electrode PE2. That is, the voltage corresponding to about an intermediate value between the data voltage and the storage voltage Vcst is applied to the second pixel electrode PE2.

A second pixel voltage which corresponds to a voltage level difference between the voltage applied to the second pixel electrode PE2 and the common voltage Vcom is charged to the second liquid crystal capacitor Clc2. That is, the second pixel voltage having a voltage level lower than that of the first pixel voltage is charged to the second liquid crystal capacitor Clc2. Accordingly, the second pixel voltage having a voltage level lower than that of the first pixel voltage is charged to the second sub-pixel SPX2.

Through the operation carried out in the aforementioned manner, a viewer may perceive a gray level corresponding to an intermediate value between the first pixel voltage charged to the pixel PX1 and the second pixel voltage.

Figure 4:
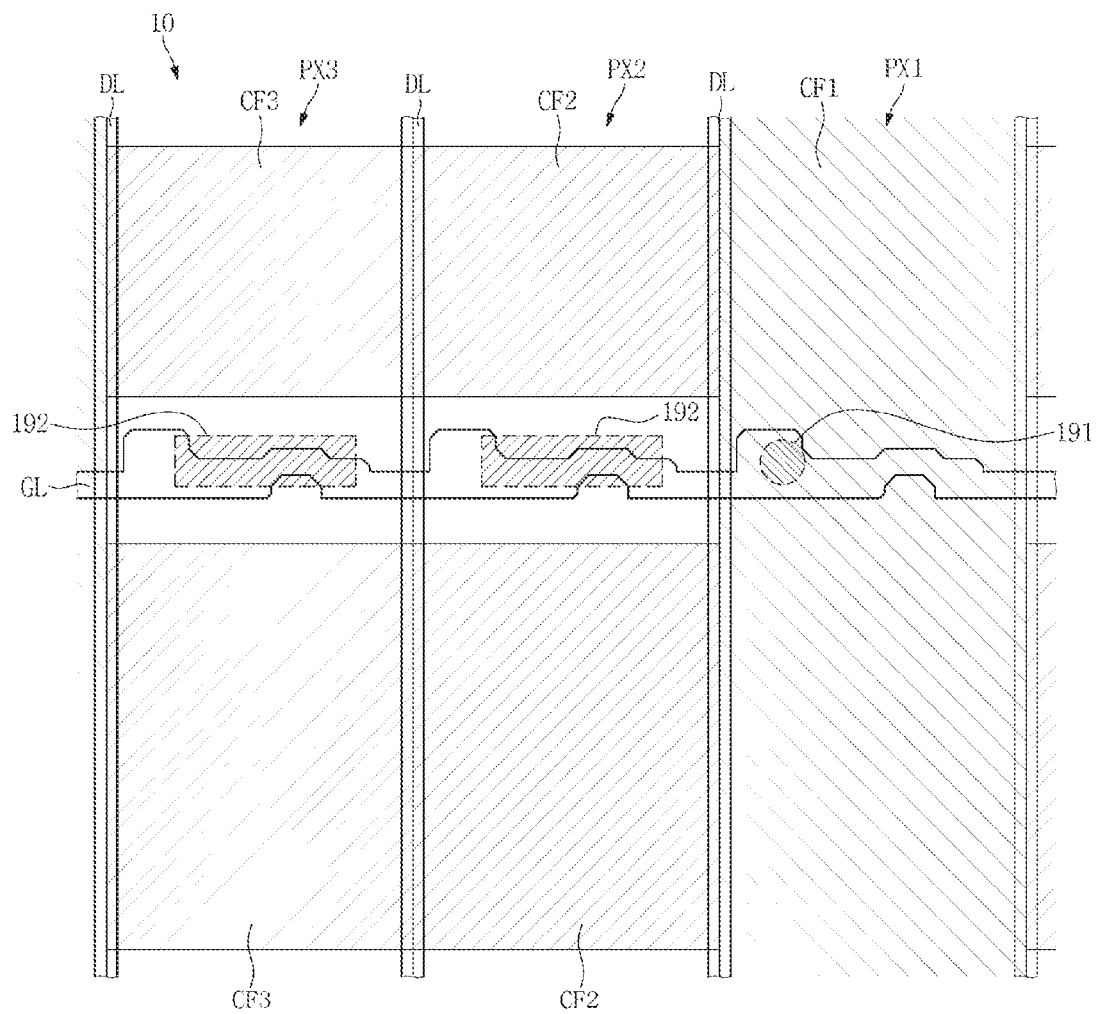
FIG. 4 is a plan view illustrating disposition of an exemplary embodiment of a color filter.
Figure 5:
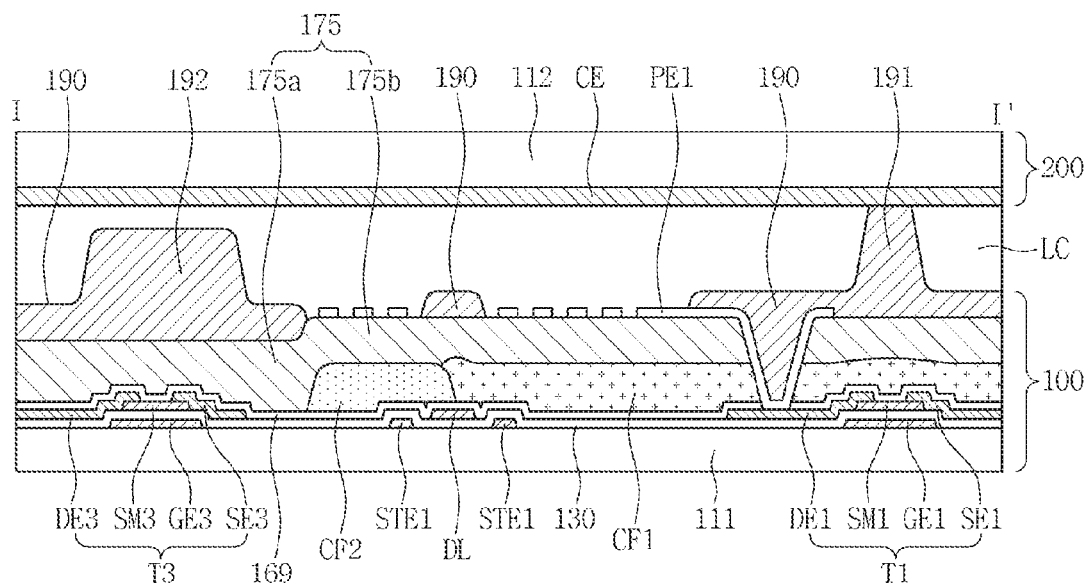
FIG. 5 is a cross-sectional view taken along line I-I' of FIG. 1.

FIG. 4 is a plan view illustrating a disposition of an exemplary embodiment of the first, second, and third color filters CF1, CF2, and CF3, and FIG. 5 is a cross-sectional view taken along line I-I' of FIG. 1.

Referring to FIGS. 1, 2, and 5, the exemplary embodiment of the LCD device 10 includes a display substrate 100, an opposing substrate 200, and a liquid crystal layer LC between the display substrate 100 and the opposing substrate 200. The exemplary embodiment of the LCD device 10 may further include a backlight unit (not illustrated) that outputs light toward the display substrate 100. Herein, the scope of the exemplary embodiments is not limited to the LCD device, and the exemplary embodiments may be applied to various other types of the display device such as an organic light emitting diode ("OLED") device.

The display substrate 100 includes a base substrate 111, a plurality of TFTs T1, T2, and T3, color filters CF1, CF2, and CF3, a passivation layer 175, and pixel electrodes PE1 and PE2, for example.

The base substrate S1 may be an insulating substrate including glass or plastic.

The gate line GL, the first, second, and third gate electrodes GE1, GE2, and GE3 branching off from the gate line GL, the first storage line SL1, the first storage electrode STE1, the second storage line SL2, and the second storage electrode STE2 are disposed on the base substrate 111.

A gate insulating layer 130, which covers the gate line GL, the first, second, and third gate electrodes GE1, GE2, and GE3, the first and second storage lines SL1 and SL2, and the first and second storage electrodes STE1 and STE2, is disposed above the base substrate 111. The gate insulating layer 130 may include or consist of an insulating material. In an exemplary embodiment, the gate insulating layer 130 may include at least one of silicon nitrides and silicon oxides, for example.

The first, second, and third semiconductor layers SM1, SM2, and SM3 are disposed on the gate insulating layer 130. In an exemplary embodiment, the first, second, and third semiconductor layers SM1, SM2, and SM3 may include or consist of amorphous silicon or an oxide semiconductor including at least one of gallium (Ga), indium (In), tin (Sn), and zinc (Zn), for example. Although not illustrated, an ohmic contact layer (not illustrated) may be disposed on the first, second, and third semiconductor layers SM1, SM2, and SM3.

The date line DL, the first, second, and third source electrodes SE1, SE2, and SE3, and the first, second, and third drain electrodes DE1, DE2, and DE3 are disposed on the base substrate 111 on which the first, second, and third semiconductor layers SM1, SM2, and SM3 are disposed.

The data line DL extends in the first direction, i.e., in a longitudinal direction, and is disposed on the gate insulating layer 130. The first, second, and third source electrodes SE1, SE2, and SE3 are disposed to overlap portions of the first, second, and third semiconductor layers SM1, SM2, and SM3, respectively, and the first, second, and third drain electrodes DE1, DE2, and DE3 are disposed to overlap another portions of the first, second, and third semiconductor layers SM1, SM2, and SM3 to be spaced apart from the first, second, and third source electrodes SE1, SE2, and SE3, respectively, such that the first, second, and third TFTs T1, T2, and T3 are provided.

The third source electrode SE3 of the third TFT T3 is electrically connected to the first storage electrode STE1 through the third contact hole H3 which is defined through the gate insulating layer 130.

An insulating interlayer 169 is disposed to overlap the data line DL, and the first, second, and third TFTs T1, T2, and T3. The insulating interlayer 169 covers upper portions of the first, second, and third semiconductor layers SM1, SM2, and SM3 that are exposed. In an exemplary embodiment, the insulating interlayer 169 may have a monolayer or a multilayer structure including silicon oxide, silicon nitride, and/or a photosensitive organic or silicon-based low dielectric constant insulating material, for example.

The first, second, and third color filters CF1, CF2, and CF3 are disposed on the insulating interlayer 169.

The first, second, and third color filters CF1, CF2, and CF3 are disposed to overlap the first and second pixel electrodes PE1 and PE2 and impart color to light that is transmitted through the pixels PX1, PX2, and PX3. In an exemplary embodiment, the first, second, and third color filters CF1, CF2, and CF3 have different colors from one another, and may each be one selected from a red color filter, a green color filter, a blue color filter, a cyan color filter, a magenta color filter, a yellow color filter, and a white color filter. One of the first, second, and third color filters CF1, CF2, and CF3 may be a white color filter. However, the invention is not limited thereto, and first, second, and third color filters CF1, CF2, and CF3 may represent various other colors.

In an exemplary embodiment, the first color filter CF1 may be a blue color filter, the second color filter CF2 may be a green color filter, and the third color filter CF3 may be a red color filter, for example.

Referring to FIG. 4, the first color filter CF1 extends in a direction to be disposed on the base substrate 111. In an exemplary embodiment, the first color filter CF1 may have a linear planar shape extending in the first direction, i.e., in the longitudinal direction in FIG. 4, for example.

The plurality of second color filters CF2 is disposed on the base substrate 111 to be adjacent to the first color filter CF1. In an exemplary embodiment, the plurality of color filters CF2 is spaced apart from one another along the first direction to be disposed in an island shape, for example.

Referring to FIG. 4, the first color filter CF1 overlaps the gate line GL, and the second color filter CF2 does not overlap the gate line GL. In addition, the first color filter CF1 overlaps the first, second, and third TFTs T1, T2, and T3, and the second color filter CF2 does not overlap the first, second, and third TFTs T1, T2, and T3.

The plurality of third color filters CF3 is disposed on the base substrate 111 to be adjacent to the second color filter CF2. In an exemplary embodiment, the plurality of third color filters CF3 is spaced apart from one another along the first direction to be disposed in an island shape, for example. Although not illustrated, the plurality of third color filters CF3 is adjacent to the first color filter CF1.

Referring to FIGS. 4 and 5, the first color filter CF1 and the second color filter CF2 overlap each other in a border area therebetween, the second color filter CF2 and the third color filter CF3 overlap each other in a border area therebetween, and the third color filter CF3 and the first color filter CF1 overlap each other in a border area therebetween.

The passivation layer 175 is disposed above the insulating interlayer 169 and the first, second, and third color filters CF1, CF2, and CF3. In an exemplary embodiment, the passivation layer 175 may have a monolayer structure or a multilayer structure including silicon oxide, silicon nitride, and/or a photosensitive organic or silicon-based low dielectric constant insulating material. In the case that the passivation layer 175 includes an organic material, the passivation layer 175 may be referred to as an organic layer. In an exemplary embodiment, the passivation layer 175 may have a thickness in a range of about 1.0 micrometer ($\mu$m) to about 3.5 $\mu$m, for example.

The passivation layer 175 includes a convex portion 175b on the first, second, and third color filters CF1, CF2, and CF3 and a concave portion 175a among the second color filters CF2 and among the third color filters CF3. That is, the concave portion 175a is defined in a portion of the passivation layer 175 where the first, second, and third color filters CF1, CF2, and CF3 are absent.

The concave portion 175a overlaps the gate line GL and the first, second, and third TFTs T1, T2, and T3. The concave portion 175a may be defined in a portion other than the portion corresponding to the gate line GL and the first, second, and third TFTs T1, T2, and T3.

Due to a height hc1 of the first, second, and third color filters CF1, CF2, and CF3, the concave portion 175a and the convex portion 175b have heights hp1 and hp2 that are different from each other with respect to a surface of the base substrate 111.

Even though the organic material is uniformly coated over an area on which the first, second, and third color filters CF1, CF2, and CF3 are disposed and an area on which the first, second, and third color filters CF1, CF2, and CF3 are absent, since the organic material has a certain degree of liquidity, a portion of the organic material moves toward a lower area, i.e., an area on which the first, second, and third color filters CF1, CF2, and CF3 are absent. Accordingly, a difference between the height hp2 of the convex portion 175b and the height hp1 of the concave portion 175a may be smaller than the height hc1 of the first, second, and third color filters CF1, CF2, and CF3. The height difference hp2–hp1 between the convex portion 175b and the concave portion 175a may be referred to as a step difference of the passivation layer 175.

In an exemplary embodiment, in the case that the first, second, and third color filters CF1, CF2, and CF3 have a height of about 2.4 $\mu$m, the concave portion 175a and the convex portion 175b may have a height difference of about 1 $\mu$m, for example. As such, the concave portion 175a and the convex portion 175b of the passivation layer 175 may have a step difference without an additional patterning process.

Portions of the insulating interlayer 169 and the passivation layer 175 are removed such that the first contact hole H1 exposing a portion of the first drain electrode DE1 and a second contact hole H2 exposing a portion of the second drain electrode DE2 are defined.

The first pixel electrode PE1 and the second pixel electrode PE2 are disposed on the passivation layer 175. Each of the first pixel electrode PE1 and the second pixel electrode PE2 is disposed to overlap the first, second, and third color filters CF1, CF2, and CF3.

Hereinafter, the first pixel electrode PE1 and the second pixel electrode PE2 are collectively referred to as a pixel electrode PE, not distinguished from each other. The exemplary embodiment of the pixel electrode PE (refer to FIG. 7) may refer to one of the first pixel electrode PE1 and the second pixel electrode PE2, and may refer to both of the first pixel electrode PE1 and the second pixel electrode PE2.

The first pixel electrode PE1 is electrically connected to the first drain electrode DE1 through the first contact hole H1. The second pixel electrode PE2 is electrically connected to the second drain electrode DE2 through the second contact hole H2.

Referring to FIGS. 1 and 2, each of the first and second pixel electrodes PE1 and PE2 includes a stem portion having a cross-shape and a plurality of branch portions extending from the stem portion.

The first and second pixel electrodes PE1 and PE2 may include or consist of a transparent conductive material. In an exemplary embodiment, the first and second pixel electrodes PE1 and PE2 may include or consist of a transparent conductive material such as indium tin oxide ("ITO"), indium zinc oxide ("IZO"), indium tin zinc oxide ("ITZO"), and aluminum zinc oxide ("AZO"), for example.

The light blocking portion 190 is disposed on the passivation layer 175. The main column spacer 191 protrudes from the light blocking portion 190, and the sub-column spacer 192 protrudes from the light blocking portion 190 to be spaced apart from the main column spacer 191. The main column spacer 191 overlaps the first color filter CF1, and the sub-column spacer 192 is disposed between two of the second color filters CF2 that are adjacent to each other. Referring to FIG. 4, the sub-column spacer 192 is also disposed between two of the third color filters CF3 that are adjacent to each other. The sub-column spacer 192 is disposed on the concave portion 175a of the passivation layer 175.

Configurations of the light blocking portion 190, the main column spacer 191, and the sub-column spacer 192 will be described further in detail below.

Although not illustrated, a lower alignment layer (not illustrated) may be disposed above the first and second pixel electrodes PE1 and PE2 and the light blocking portion 190. The lower alignment layer may be a homeotropic alignment layer, and may include a photosensitive material.

The opposing substrate 200 may include an opposing base substrate 112, a common electrode CE, and the like. The opposing base substrate 112 is disposed to oppose the base substrate 111, and a liquid crystal layer is disposed between the base substrate 111 and the opposing base substrate 112.

In an exemplary embodiment, the opposing base substrate 112 is an insulating substrate including transparent glass or plastic.

The common electrode CE is disposed on the opposing base substrate 112. In an exemplary embodiment, the common electrode CE may include or consist of a transparent conductive oxide such as ITO, IZO, or AZO, for example.

Although not illustrated, an upper alignment layer may be disposed on the common electrode CE. The upper alignment layer may include a material included in the aforementioned lower alignment layer.

When a surface of the base substrate 111 and a surface of the opposing base substrate 112 that face each other are defined as upper surfaces of the corresponding substrates, respectively, and surfaces opposite to the upper surfaces are defined as lower surfaces of the corresponding substrates, respectively, polarizers may be disposed on the lower surface of the base substrate 111 and the lower surface of the base substrate 112, respectively.

The liquid crystal layer LC is disposed in a distanced space between the display substrate 100 and the opposing substrate 200 secured by the main column spacer 191 and the sub-column spacer 192. The liquid crystal layer LC may include liquid crystal molecules.

Hereinafter, the light blocking portion 190, the main column spacer 191, and the sub-column spacer 192 will be described further in detail.

The light blocking portion 190 is disposed on the passivation layer 175, and the main column spacer 191 and the sub-column spacer 192 have a structure protruding from the light blocking portion 190. Referring to FIGS. 1 and 4, the main column spacer 191 and the sub-column spacer 192 are disposed between the first and second pixel electrodes PE1 and PE2 that are adjacent to each other along a direction (a longitudinal direction in the drawings).

The main column spacer 191 and the sub-column spacer 192 may include or consist of the same material as that included in the light blocking portion 190, or alternatively, may include a different material from that included in the light blocking portion 190. It may be advantageous that the light blocking portion 190, the main column spacer 191, and the sub-column spacer 192 are unitary with one another using the same material. In such an exemplary embodiment, a photolithography method may be applied, for example.

A structure in which the light blocking potion 190, the main column spacer 191, and the sub-column spacer 192 are simultaneously provided into a unitary structure is referred to as a black column spacer structure. The exemplary embodiment of the LCD device 10 has the black column spacer structure.

The light blocking portion 190, the main column spacer 191, and the sub-column spacer 192 may include or consist of a negative-type photosensitive composition of which an unexposed portion is developed. In an exemplary embodiment, the photosensitive composition used in forming of the light blocking portion 190 may include a binder resin, a polymerizable monomer, a polymerizable oligomer, a pigment, a dispersant, and a photoinitiator, for example. Hereinafter, the photosensitive composition forming the light blocking portion 190, the main column spacer 191, and the sub-column spacer 192 will be referred to as a light blocking material.

The light blocking portion 190 is disposed in an area aside from an area corresponding to the first and second pixel electrodes PE1 and PE2, and may overlap a portion of an edge portion of the first and second pixel electrodes PE1 and PE2. In an alternative exemplary embodiment, the light blocking portion 190 may not overlap the first and second pixel electrodes PE1 and PE2.

The light blocking portion 190 prevents light applied from a backlight unit (not illustrated) from being externally dissipated and further prevents external light from being irradiated to the gate line GL, the data line DL, and the first, second, and third TFTs T1, T2, and T3. The light blocking portion 190 is also referred to as a black matrix.

Figure 6:
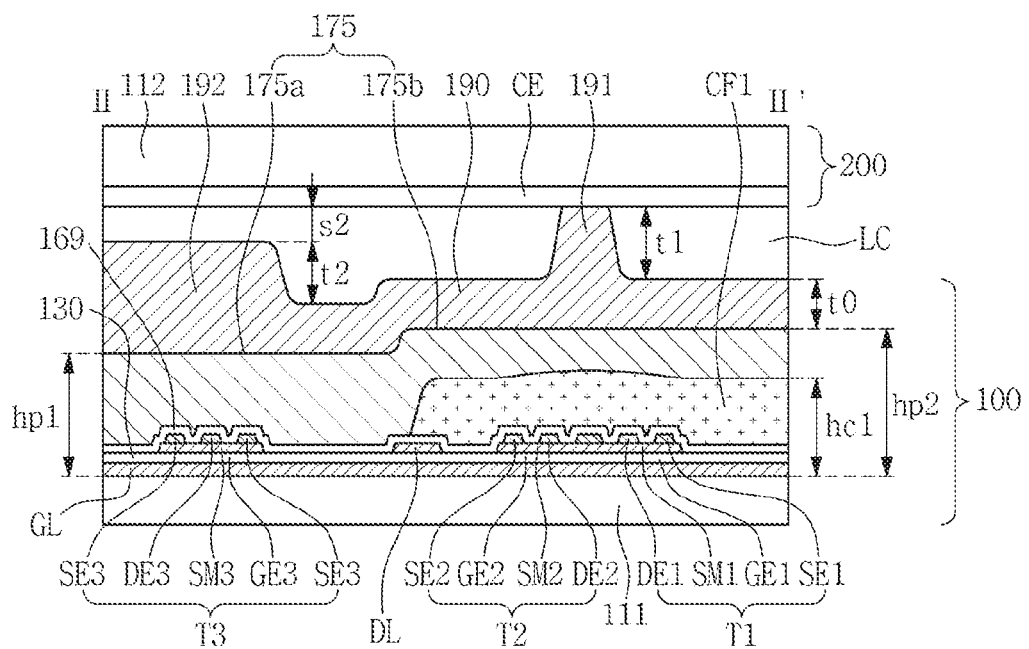
FIG. 6 is a cross-sectional view taken along line II-II' of FIG. 1.

Referring to FIGS. 1, 5, and 6, the light blocking portion 190 is disposed above the gate line GL, the first, second, and third TFTs T1, T2, and T3, and the data line DL. Accordingly, the light blocking portion 190 may have a mesh-shaped planar surface disposed along the gate line GL and the data line DL. That is, the light blocking portion 190 may have a mesh-shaped pattern, for example.

However, the exemplary embodiment is not limited thereto, and the light blocking portion 190 may only be disposed over the gate line GL. That is, the light blocking portion 190 may have a linear pattern, for example.

Due to the step difference of the passivation layer 175, the light blocking portion 190 has a step difference. In such an exemplary embodiment, a height difference hp2−hp1 between a height hp2+t0 of a portion of the light blocking portion 190 above the block portion 175b of the passivation layer 175 and a height hp1+t0 of a portion of the light blocking portion 190 above the concave portion 175a corresponds to a step difference of the light blocking portion 190. The light blocking portion 190 may have the same thickness t0 across a portion of the light blocking portion 190 below which the first color filter CF1 is disposed and a portion thereof below which the first color filter CF1 is absent.

Due to the step difference hp2−hp1 of the light blocking portion 190, the main column spacer 191 and the sub-column spacer 192 may have a height difference.

As illustrated in FIGS. 5 and 6, the main column spacer 191 is disposed above the concave portion 175b of the passivation layer 175, and the sub-column spacer 192 is disposed above the concave portion 175a of the passivation layer 175. That is, the sub-column spacer 192 does not overlap the second color filter CF2. In addition, the sub-column spacer 192 does not overlap the first and third color filters CF1 and CF3. Accordingly, although the main column spacer 191 and the sub-column spacer 192 have the same thickness t1=t2, the main column spacer 191 and the sub-column spacer 192 may have a height difference.

Referring to FIGS. 5 and 6, the main column spacer 191 and the sub-column spacer 192 have substantially the same thickness t1=t2 with respect to portions of a surface of the light blocking portion 190 that are adjacent to the main column spacer 191 and the sub-column spacer 192, respectively. However, the main column spacer 191 has a greater height hp2+t0+t1 than a height hp1+t0+t2 of the sub-column spacer 192 with respect to a surface of the base substrate 111 (i.e., hp2+t0+t1>hp1+t0+t2).

The main column spacer 191 contacts the opposing substrate 200 to support the display substrate 100 and the opposing substrate 200, and the sub-column spacer 192 is spaced apart from the opposing substrate 200 by a distance s2. The distance s2 between the sub-column spacer 192 and the opposing substrate 200 may be substantially the same as or different from the step difference hp2−hp1 of the light blocking portion 190.

In an exemplary embodiment, the main column spacer 191 and the sub-column spacer 192 may have a height difference of about 0.55 µm or greater, for example. Since the exemplary embodiment of the concave portion 175a and the convex portion 175b has a height difference of about 1 µm, the main column spacer 191 and the sub-column spacer 192 may have a height difference of about 0.55 µm or greater therebetween with respect to the surface of the base substrate 111 even in the case that the main column spacer 191 and the sub-column spacer 192 have the same thickness.

Hereinafter, an exemplary embodiment will be described with reference to FIGS. 7, 8, and 9.

Figure 7:
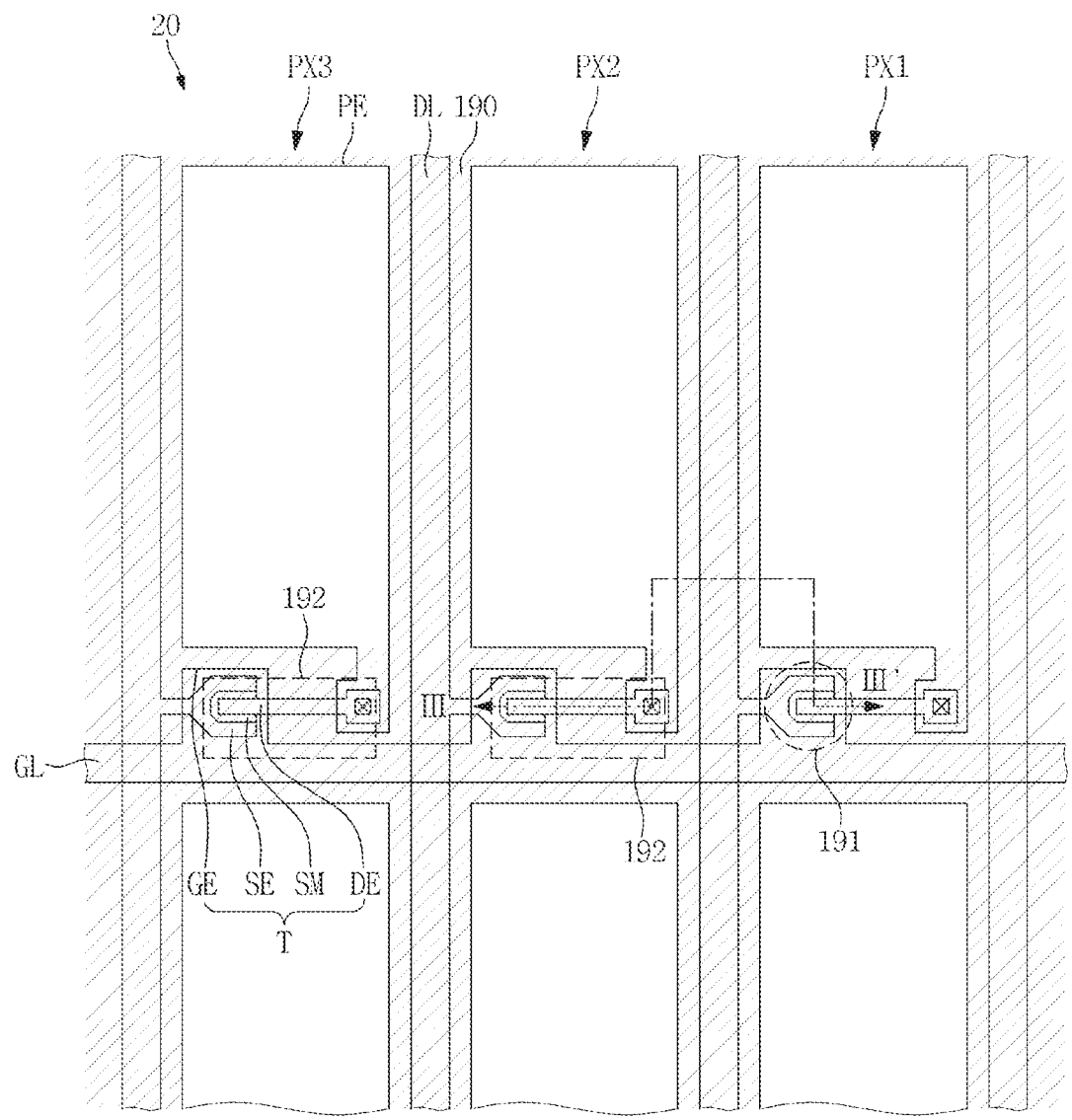
FIG. 7 is a plan view illustrating an exemplary embodiment of a display device.
Figure 8:
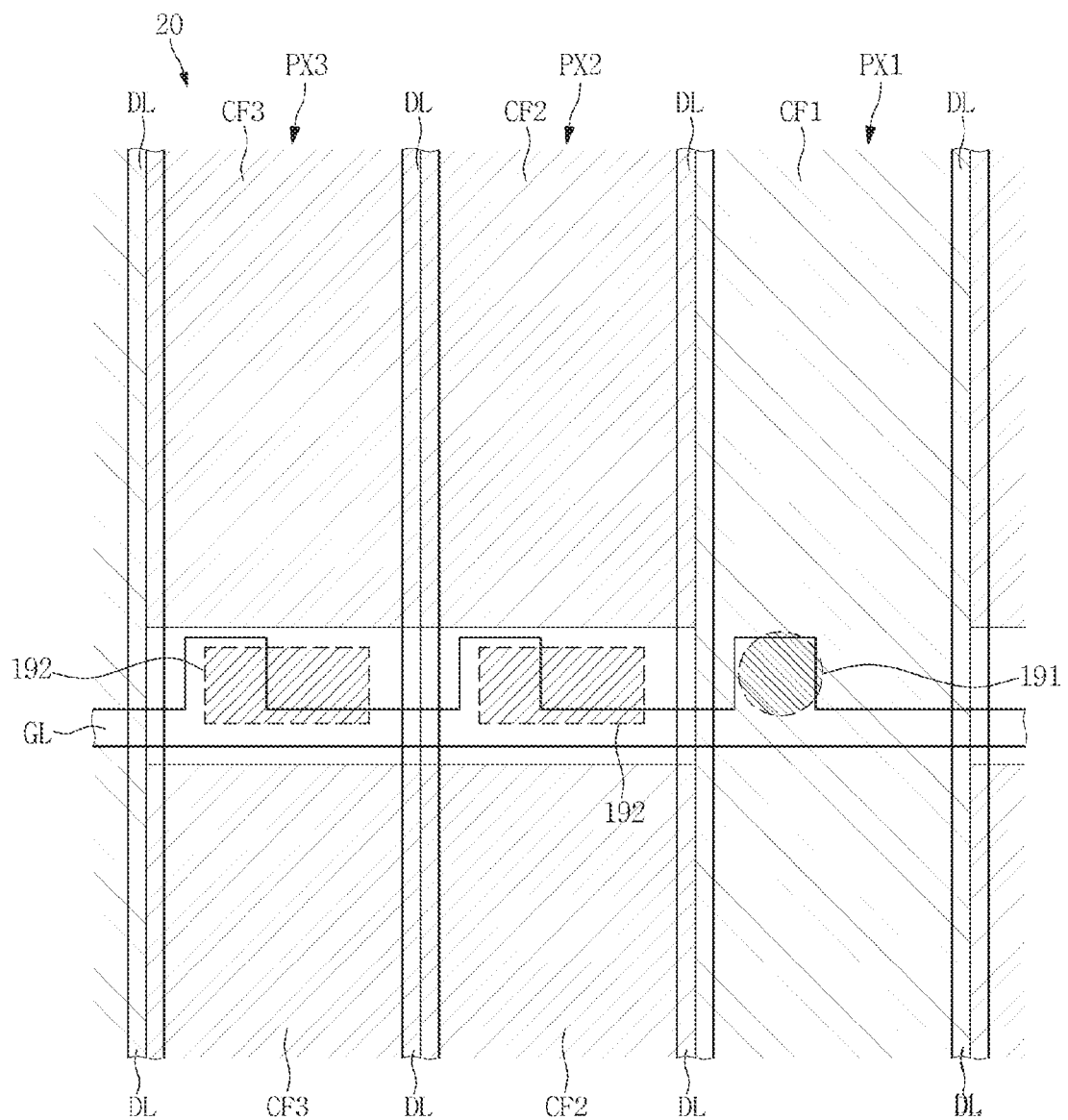
FIG. 8 is a plan view illustrating disposition of an exemplary embodiment of a color filter.
Figure 9:
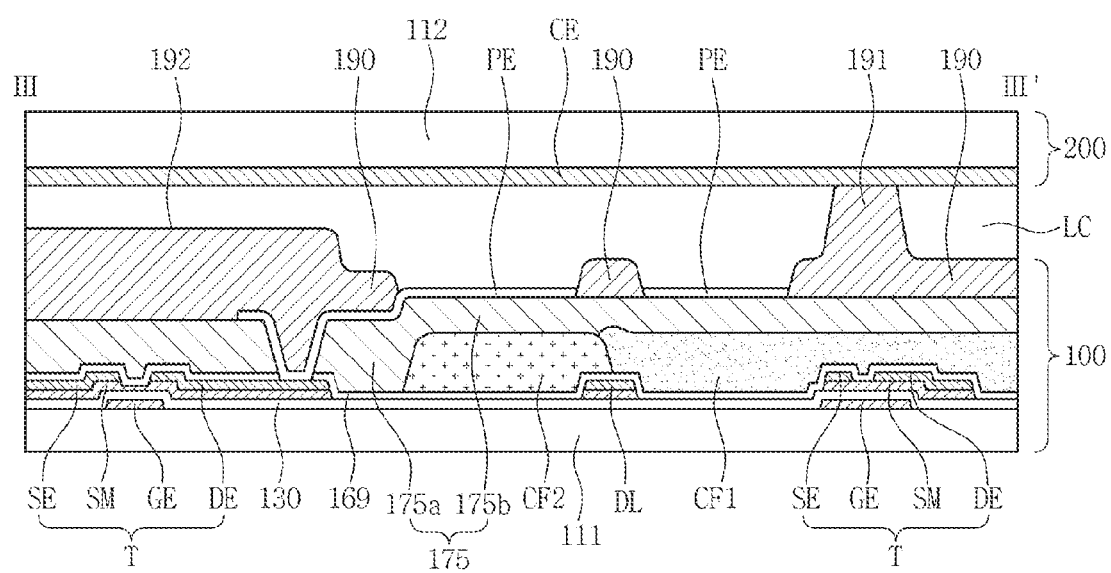
FIG. 9 is a cross-sectional view taken along line III-III' of FIG. 7.

FIG. 7 is a plan view illustrating an exemplary embodiment of a display device, FIG. 8 is a plan view illustrating disposition of an exemplary embodiment of a color filter, and FIG. 9 is a cross-sectional view taken along line III-III' of FIG. 7.

The exemplary embodiment of the display device is an LCD device 20. Descriptions pertaining to the configurations described hereinabove will be omitted in order to avoid repetition.

Referring to FIGS. 7, 8, and 9, the LCD device 20 includes a plurality of pixels PX1, PX2, and PX3. Each of the pixels PX1, PX2, and PX3 includes one TFT T and one pixel electrode PE.

Referring to FIGS. 7, 8, and 9, a TFT T is defined by a gate electrode GE protruding from a gate line GL, a source electrode SE protruding from a data line DL, a drain electrode DE connected to the pixel electrode PE, and a semiconductor layer SM.

An insulating interlayer 169 is disposed on the TFT T, and a first color filter CF1, a second color filter CF2, and a third color filter CF3 are disposed on the insulating interlayer 169. In an exemplary embodiment, the first color filter CF1 may be a blue color filter, the second color filter CF2 may be a green color filter, and the third color filter CF3 may be a red color filter, for example. A white color filter (not illustrated) may be used as the color filter.

Referring to FIG. 8, the first color filter CF1 overlaps the gate line GL and the TFT T, and the second and third color filters CF2 and CF3 do not overlap the gate line GL and the TFT T. Referring to FIG. 9, the first, second, and third color filters CF1, CF2, and CF3 overlap one another in border areas thereamong.

A passivation layer 175 is disposed on the insulating interlayer 169 and the first, second, and third color filters CF1, CF2, and CF3. The passivation layer 175 includes a concave portion 175a and a convex portion 175b, and the concave portion 175a and the convex portion 175b have a height difference.

Referring to FIGS. 8 and 9, the concave portion 175a overlaps the gate line GL and the TFT T.

A light blocking portion 190 is disposed on the passivation layer 175. A main column spacer 191 and a sub-column spacer 192 protrude from the light blocking portion 190 to be disposed on the light blocking portion 190.

The light blocking portion 190 is disposed on a portion of the passivation layer 175 other than an area corresponding to the pixel electrode PE. The light blocking portion 190 may overlap a portion of an edge portion of the pixel electrode PE or may not overlap the pixel electrode PE.

The main column spacer 191 and the sub-column spacer 192 have substantially the same thickness with respect to portions of a surface of the light blocking portion 190 that are adjacent to the main column spacer 191 and the sub-column spacer 192, respectively. In addition, the main column spacer 191 has a greater thickness than the thickness of the sub-column spacer 192 with respect to a surface of the base substrate 111.

According to the exemplary embodiment, the light blocking portion 190, the main column spacer 191, and the sub-column spacer 192 may include the same material and may be manufactured in the same process.

Hereinafter, an exemplary embodiment will be described with reference to FIGS. 10 and 11.

Figure 10:
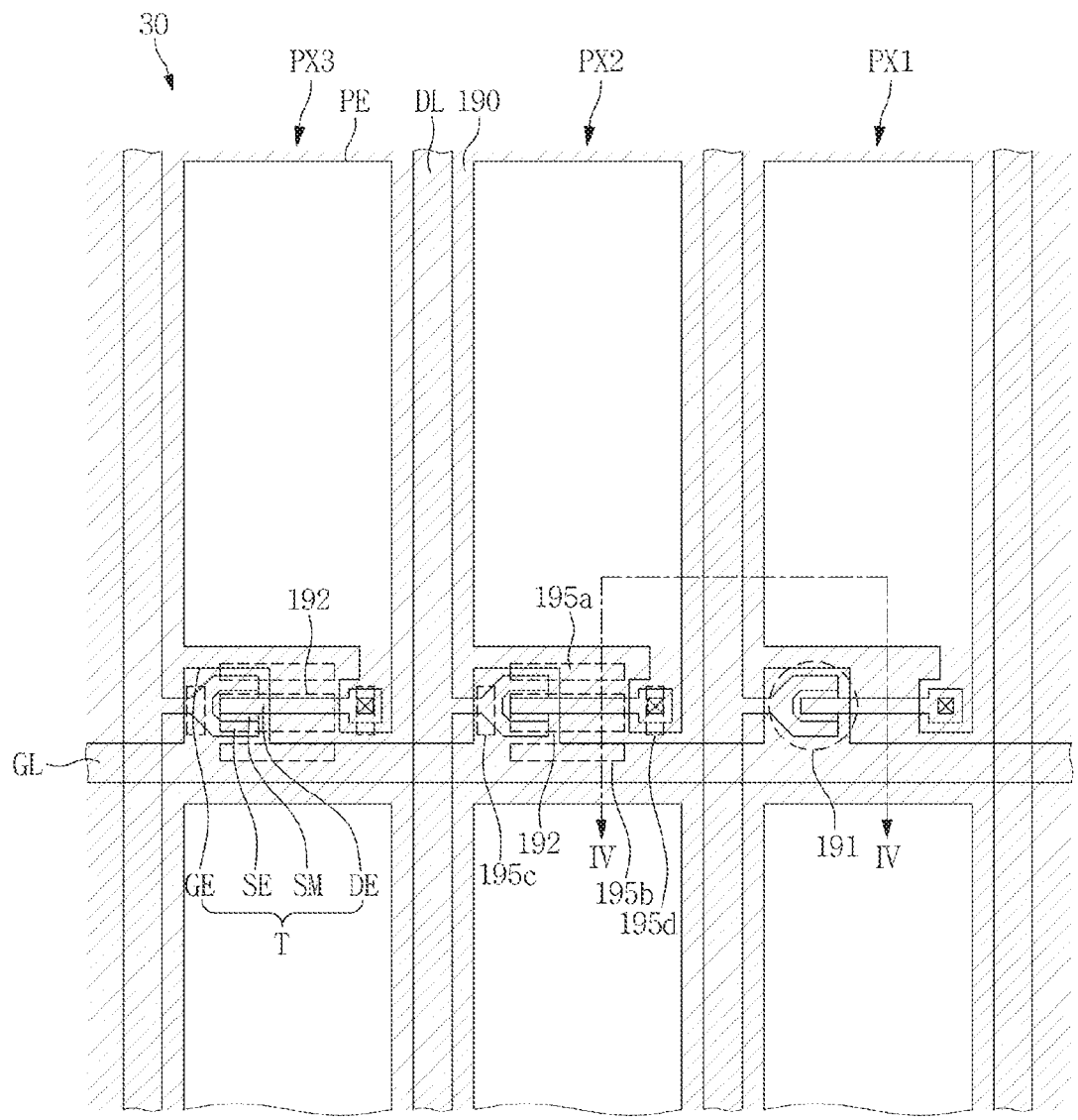
FIG. 10 is a plan view illustrating an exemplary embodiment of a display device.
Figure 11:
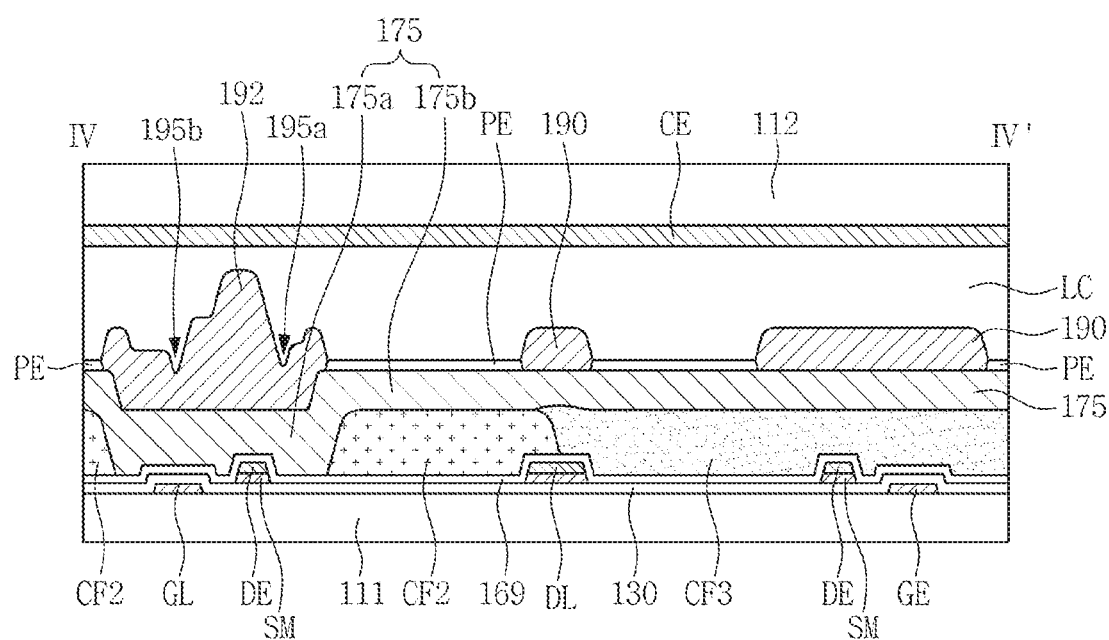
FIG. 11 is a cross-sectional view taken along line IV-IV' of FIG. 10.

FIG. 10 is a plan view illustrating an exemplary embodiment of a display device, and FIG. 11 is a cross-sectional view taken along line IV-IV' of FIG. 10.

The exemplary embodiment of the display device is an LCD device 30.

Referring to FIGS. 10 and 11, a light blocking portion has recessed portions 195a, 195b, 195c, and 195d that are spaced apart from a sub-column spacer 192. In an exemplary embodiment, the recessed portions 195a, 195b, 195c, and 195d are defined on a concave portion 175a of the passivation layer 175 to surround the sub-column spacer 192, and thus define a position of the sub-column spacer 192, for example.

Referring to FIG. 11, as the recessed portions 195a, 195b, 195c, and 195d are defined around the sub-column spacer 192, a length of an inclined surface of the sub-column spacer 192 becomes longer, and an inclination angle, i.e., a taper angle, is increased. In the case that the taper angle of the sub-column spacer 192 increases, a planar area of an upper surface of the sub-column spacer 192 increases such that an efficient planar area of the sub-column spacer 192 that supports an opposing substrate 200 may be increased.

In addition, the recessed portions 195a, 195b, 195c, and 195d may function as a block in a process of forming the sub-column spacer 192. Typically, after a pattern forming a light blocking portion 190, a pattern forming the main column spacer 191, and a pattern forming the sub-column spacer 192 are provided through light exposure and developing, a light blocking material is baked or cured such that the light blocking portion 190 is provided. In the baking or curing process, patterns may collapse or be damaged, which may be referred to as "reflow." In such an exemplary embodiment, in the case that the recessed portions 195a, 195b, 195c, and 195d serve as a block that defines an area of the sub-column spacer 192, the light blocking material that is reflown may be prevented from being dispersed to another area. Accordingly, a degree of pattern accuracy of the sub-column spacer 192 is improved, and the display device may achieve high definition.

According to the exemplary embodiment, the sub-column spacer 192 may have a taper angle of about 45 degrees (°) or greater, and may have a top/bottom ratio (a ratio of an upper planar area to a lower planar area) of about 80 percent (%) or greater, for example.

In an exemplary embodiment, the recessed portions 195a, 195b, 195c, and 195d may have a width ranging from about 2 μm to about 10 μm along the longitudinal direction and a length ranging from about 5 μm to about 20 μm along the traverse direction, for example. In an exemplary embodiment, the recessed portions 195a, 195b, 195c, and 195d may have a depth ranging from about 0.1 μm to about 0.5 μm with respect to a surface of the light blocking portion 190, for example. In an exemplary embodiment, a space among the recessed portions 195a, 195b, 195c, and 195d may be about 5 μm to about 10 μm or greater, for example.

Although not illustrated, the recessed portions 195a, 195b, 195c, and 195d may be defined around the main column spacer 191.

Figure 12:
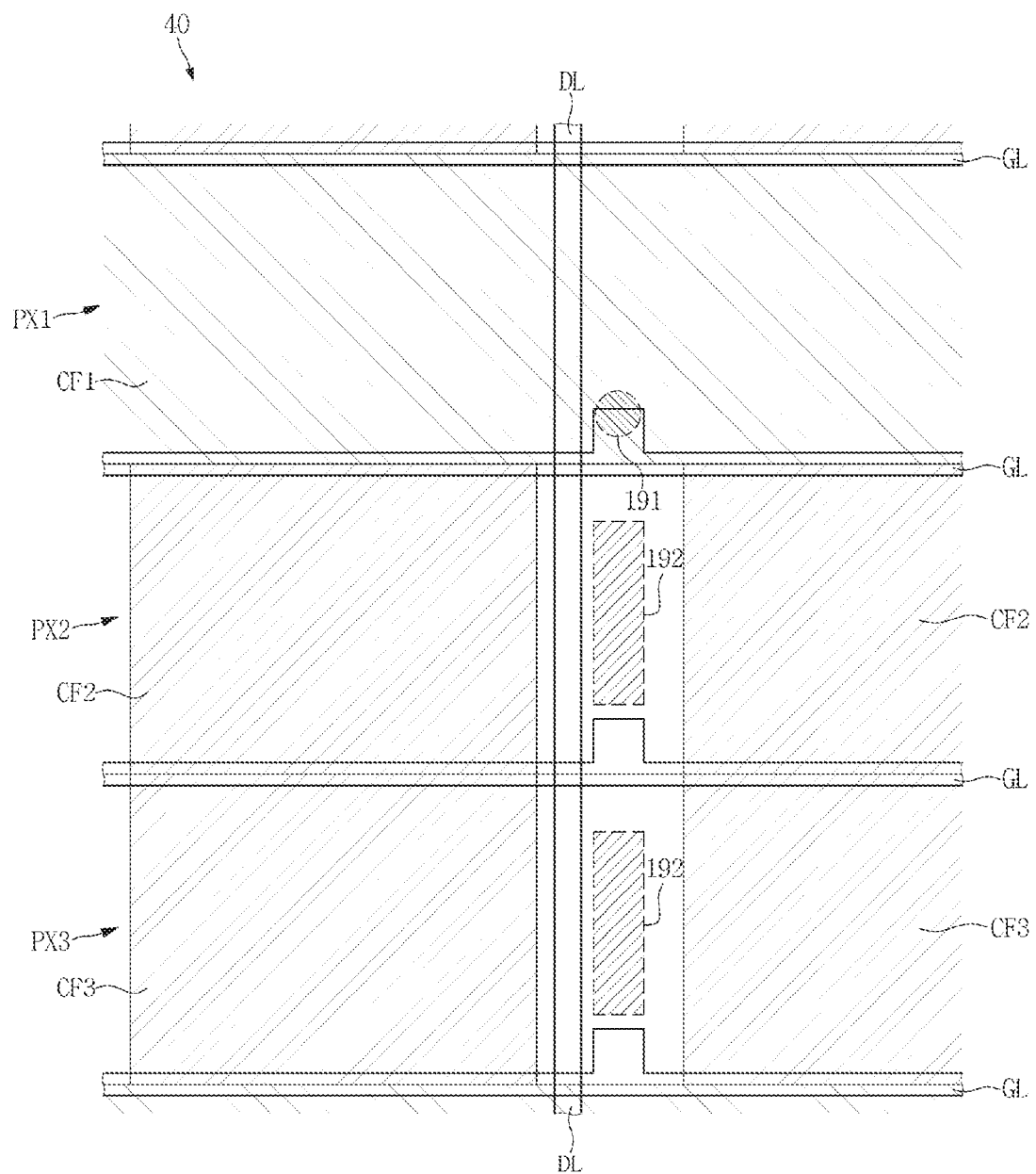
FIG. 12 is a plan view illustrating a fourth exemplary embodiment of a display device.

FIG. 12 is a plan view illustrating a fourth exemplary embodiment of a display device. The fourth exemplary embodiment of the display device is an LCD device 40.

Referring to FIG. 12, a first color filter CF1 extends along a gate line GL, and a plurality of second color filters CF2 are disposed along the first color filter CF1 to be spaced apart from each other, and a plurality of third color filters CF3 are disposed along the second color filter CF2 to be spaced apart from each other.

According to the fourth exemplary embodiment, the first color filter CF1 overlaps a data line DL, and the second and third color filters CF2 and CF3 do not overlap the data line DL. A main column spacer 191 is disposed to overlap the first color filter CF1, and a sub-column spacer 192 is disposed among the second color filters CF2. In addition, the sub-column spacer 192 is disposed among the third color filters CF3.

FIGS. 13A, 13B, 13C, 13D, 13E, 13F, 13G, and 13H are views illustrating a method of manufacturing the exemplary embodiment of the display device. Hereinafter, a method of manufacturing the exemplary embodiment of the LCD device 10 will be described with reference to FIGS. 13A, 13B, 13C, 13D, 13E, 13F, 13G, and 13H.

Figure 13A:
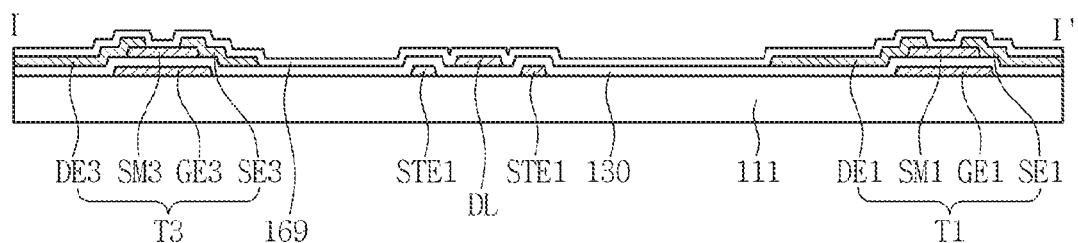
FIGS. 13A, 13B, 13C, 13D, 13E, 13F, 13G, and 13H are views illustrating a method of manufacturing the exemplary embodiment of the display device.

Referring to FIG. 13A, the first TFT T1, the second TFT T2, and the third TFT T3 are disposed on the base substrate 111 including or consisting of transparent glass or plastic.

In an exemplary embodiment, the gate line GL and the first, second, and third gate electrodes GE1, GE2 (refer to FIG. 6), and GE3 are disposed on the base substrate 111, for example. Simultaneously with the forming of the gate line GL and the first, second, and third gate electrodes GE1, GE2, and GE3, the first and second storage lines SL1 (refer to FIGS. 1 and 2) and SL2 (refer to FIGS. 1 and 2) and the first and second storage electrodes STE1 and STE2 (refer to FIGS. 1 and 2) are disposed on the base substrate 111.

The gate insulating layer 130 is disposed on the base substrate 111 to cover the gate line GL, the first, second and third gate electrodes GE1, GE2, and GE3, the first and second storage lines SL1 and SL3, and the first and second storage electrodes STE1 and STE2.

The first, second, and third semiconductor layers SM1, SM2 (refer to FIG. 6), and SM3, which overlap at least portions of the first, second, and third gate electrodes GE1, GE2, and GE3, respectively, are disposed on the gate insulating layer 130.

In addition, the data line DL, which intersects the gate line GL, is disposed on the gate insulating layer 130 and the first, second, and third source electrodes SE1, SE2, and SE3 and the first, second, and third drain electrodes DE1, DE2 (refer to FIG. 6), and DE3 are disposed on the gate insulating layer 130 such that the first, second, and third TFTs T1, T2 (refer to FIG. 6), and T3 are provided.

Subsequently, the insulating interlayer 169 is disposed on the gate insulating layer 130 and the first, second, and third TFTs T1, T2, and T3.

Figure 13B:
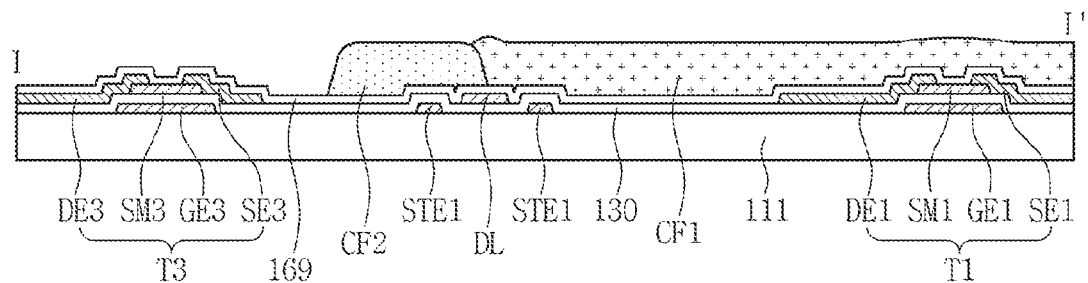

Referring to FIG. 13B, the first, second, and third color filters CF1, CF2, and CF3 are disposed on the insulating interlayer 169. Each of the first, second, and third color filters CF1, CF2, and CF3 (refer to FIG. 4) may be one selected from a red color filter, a green color filter, and a blue color filter, for example.

The first color filter CF1 extends in a direction, e.g., along the data line DL, to be disposed on the base substrate 111. The first color filter CF1 is unitary to continuously extend along a direction. In an exemplary embodiment, the first color filter CF1 may have a linear planar shape, for example.

The plurality of second color filters CF2 are disposed on the base substrate 111 discontinuously along a direction, being adjacent to the first color filter CF1. Similarly thereto, the plurality of third color filters CF3 are disposed on the base substrate 111 discontinuously along a direction, being adjacent to the plurality of second color filters CF2.

Figure 13C:
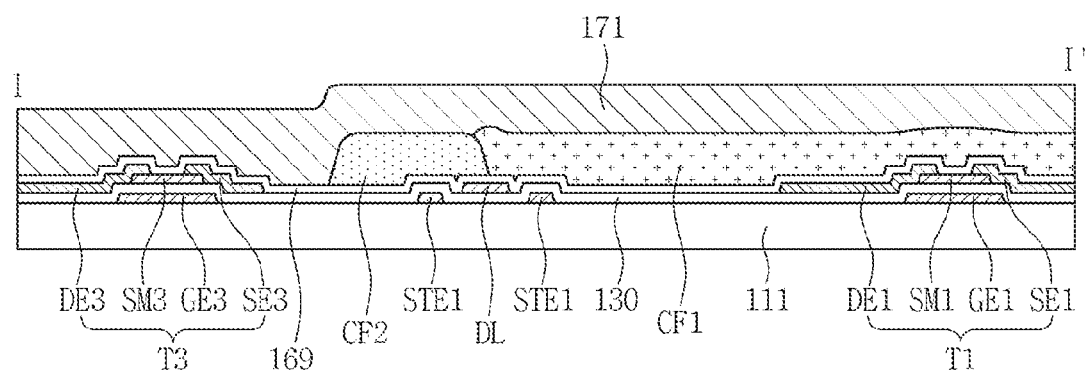

Referring to FIG. 13C, a photosensitive composition forming the passivation layer 175 is coated on the first, second, and third TFTs T1, T2, and T3 and the first, second, and third color filters CF1, CF2, and CF3. Hereinafter, the photosensitive composition forming the passivation layer 175 will be referred to as a first photosensitive composition 171.

The first photosensitive composition 171 is a negative-type photosensitive resin composition of which an exposed portion remains and an unexposed portion is developed. In an exemplary embodiment, the first photosensitive composition may include a binder resin, a polymerizable monomer, a polymerizable oligomer, a dispersant, and a photoinitiator, for example. The passivation layer 175 provided by the first photosensitive composition 171 is an organic layer.

However, the exemplary embodiment is not limited thereto, and it is obvious that a positive-type photosensitive resin composition of which solubility toward a developing solution increases by photoirradiation may be used as the first photosensitive composition 171.

Portions of the first photosensitive composition 171 respectively corresponding to an area in which the first, second, and third color filters CF1, CF2, and CF3 are disposed and an area absent the first, second, and third color filters CF1, CF2, and CF3 have different heights. Although the first photosensitive composition 171 is coated uniformly across an area in which the first, second, and third color filters CF1, CF2, and CF3 are disposed and an area absent the first, second, and third color filters CF1, CF2, and CF3, the first photosensitive composition 171 has liquidity and is movable such that a difference in height of the first photosensitive composition 171 may be smaller than the height hc1 of the first, second, and third color filters CF1, CF2, and CF3.

Figure 13D:
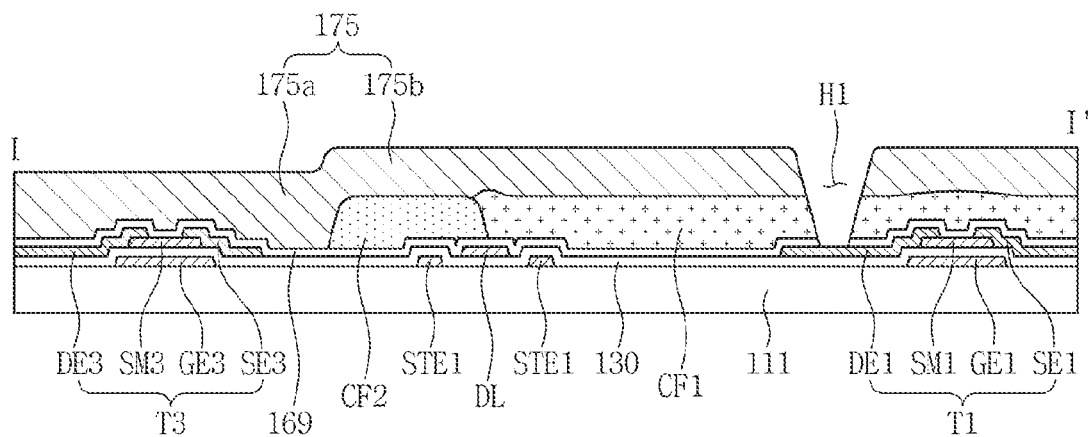

Referring to FIG. 13D, the first photosensitive composition 171 is exposed and developed such that the passivation layer 175 is provided. In such an exemplary embodiment, a portion of the first photosensitive composition 171 and a portion of the insulating interlayer 169 are removed and thereby the first and second contact holes H1 and H2 (refer to FIG. 2) exposing portions of the first and second drain electrodes DE1 and DE2, respectively, are defined.

The passivation layer 175 includes the convex portion 175b on the first, second, and third color filters CF1, CF2, and CF3 and the concave portion 175a in a distanced space among the second color filters CF2 and a distanced space among the third color filters CF3. That is, the concave portion 175a is defined in an area absent the first, second, and third color filters CF1, CF2, and CF3.

Figure 13E:
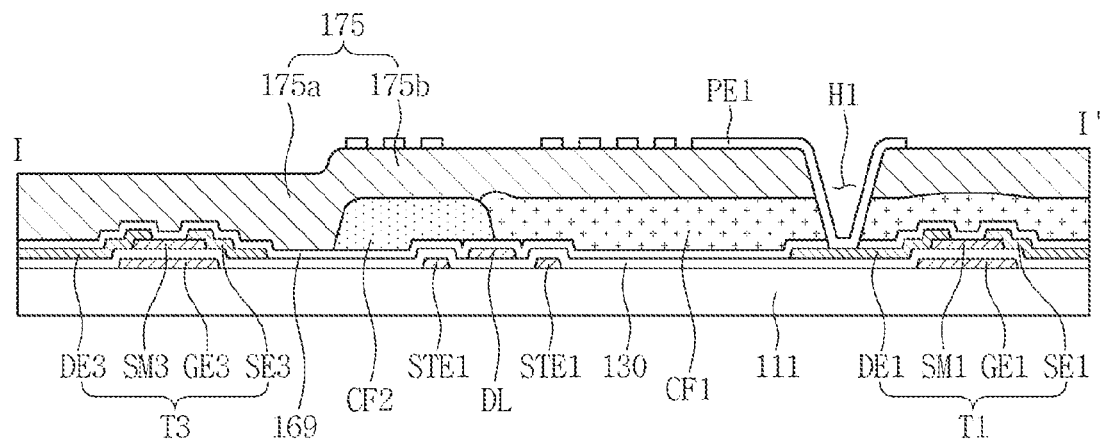

Referring to FIG. 13E, the first pixel electrode PE1 electrically connected to the first drain electrode DE1 through the first contact hole H1 is disposed on the passivation layer 175, and the second pixel electrode PE2 electrically connected to the second drain electrode DE2 through the second contact hole H2 is disposed thereon.

Figure 13F:
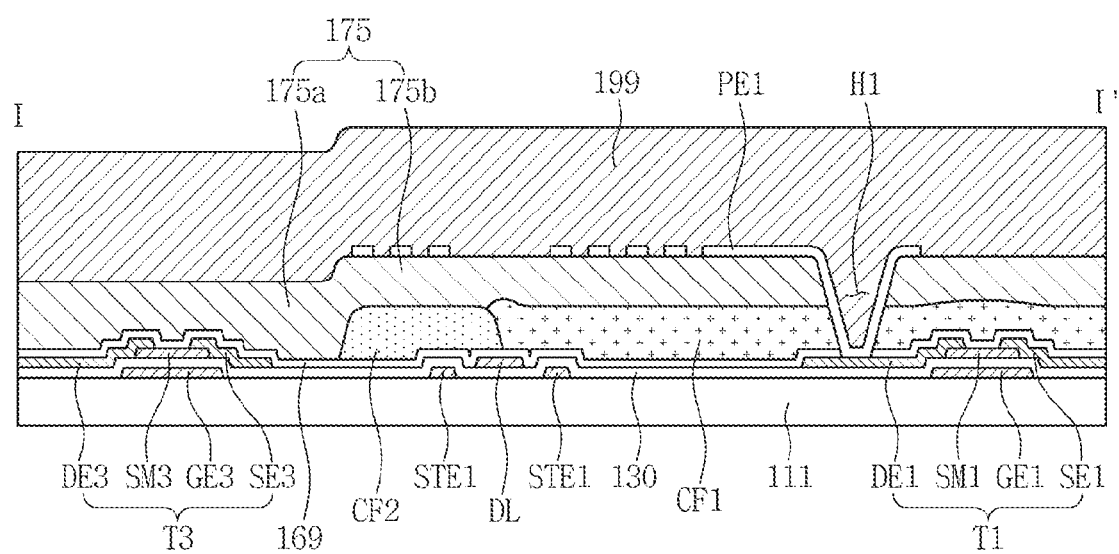

Referring to FIG. 13F, a photosensitive composition forming the light blocking portion 190 is coated on the passivation layer 175 and the first and second pixel electrodes PE1 and PE2. Hereinafter, the photosensitive composition forming the light blocking portion will be referred to as a second photosensitive composition 199. The second photosensitive composition 199 may use a negative-type photosensitive resin composition, for example. In an exemplary embodiment, the second photosensitive composition 199 may include a binder resin, a polymerizable monomer, a polymerizable oligomer, a pigment, a dispersant, and a photoinitiator, for example. The second photosensitive composition 199 is a light blocking material to integrally form the light blocking portion 190, the main column spacer 191, and the sub-column spacer 192.

Due to a step difference between the concave portion 175a and the convex portion 175b of the passivation layer 175, a portion of the light blocking portion 190 on the concave portion 175a and a portion of the light blocking portion 190 on the convex portion 175b have different heights. That is, although the second photosensitive composition 199 is coated above the concave portion 175a and above the convex portion 175b to have the same thickness, a portion of the second photosensitive composition 199 on the convex portion 175b has a greater height than a height of a portion of the second photosensitive composition 199 on the concave portion 175a with respect to an upper surface of the base substrate 111. The height difference between the portion of the second photosensitive composition 199 on the convex portion 175b and the portion of the second photosensitive composition 199 on the concave portion 175a may be the same as or different from the height difference between the concave portion 175a and the convex portion 175b.

Figure 13G:
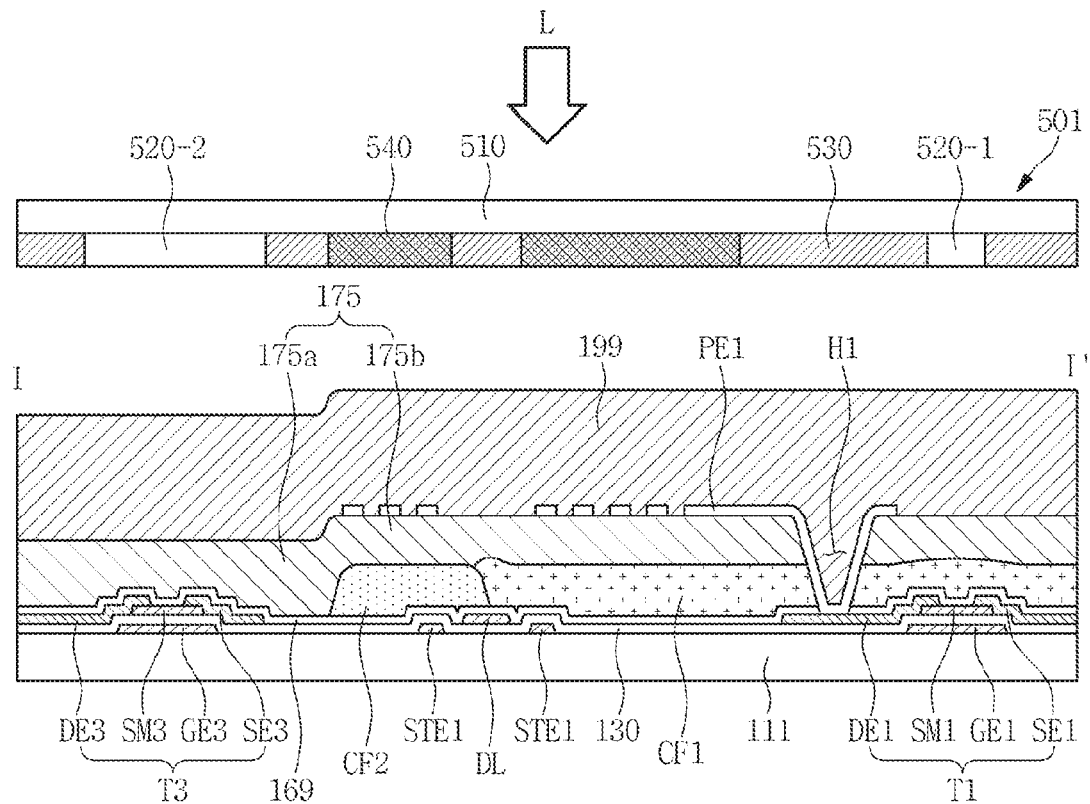

Referring to FIG. 13G, an exposure mask 501 is disposed above the second photosensitive composition 199 to be spaced apart from the second photosensitive composition 199, and a light L is irradiated to the second photosensitive composition 199 through the exposure mask 501 to perform light exposure.

The exposure mask 501 includes transmissive patterns 520-1 and 520-2, a semi-transmissive pattern 530, and a blocking pattern 540 on a transparent base 510. That is, in an exemplary embodiment, the exposure mask 501 may be a three-tone mask that includes three areas each having different light transmittances.

One of the transmissive patterns 520-1 of the exposure mask 501 is disposed above an area to be provided with the main column spacer 191, and another of the transmissive patterns 520-2 is disposed above an area to be provided with the sub-column spacer 192. The semi-transmissive pattern is disposed above an area to be provided with the light blocking portion 190 other than an area to be provided with the main column spacer 191 and the sub-column spacer 192, and the light blocking pattern 540 is disposed above an area of the first and second pixel electrodes PE1 and PE2.

In an exemplary embodiment, the transmissive patterns 520-1 and 520-2 of the exposure mask 501 may have a light transmittance of about 95% or higher, for example, about 100%, the blocking pattern 540 may have a light transmittance of about 5% or lower, for example, about 0%. In an exemplary embodiment, the semi-transmissive pattern 530 may have a light transmittance in a range of about 15% to about 60%, for example.

The light transmittances of the transmissive patterns 520-1 and 520-2, the semi-transmissive pattern 530, and the blocking pattern 540 of the exposure mask 501 may vary based on a thickness t0 of the light blocking portion 190 and the kind of the second photosensitive composition 199. In an exemplary embodiment, the transmissive patterns 520-1 and 520-2 may have a light transmittance of about 100%, the semi-transmissive pattern 530 may have a light transmittance in a range of about 15% to about 50%, and the blocking pattern 550 may have a light transmittance in a range of about 0% to about 1%, for example.

The light transmittance of the semi-transmissive pattern 530 may be controlled by adjusting a concentration of the light blocking material disposed on the transparent base 510. In addition, the semi-transmissive pattern 530 may have a structure (not illustrated) in which a transmissive portion and a light blocking slit are alternately disposed. In such an exemplary embodiment, the light transmittance of the semi-transmissive pattern 530 may be controlled by adjusting a distance between the transmissive portion and the light blocking slit.

Figure 13H:
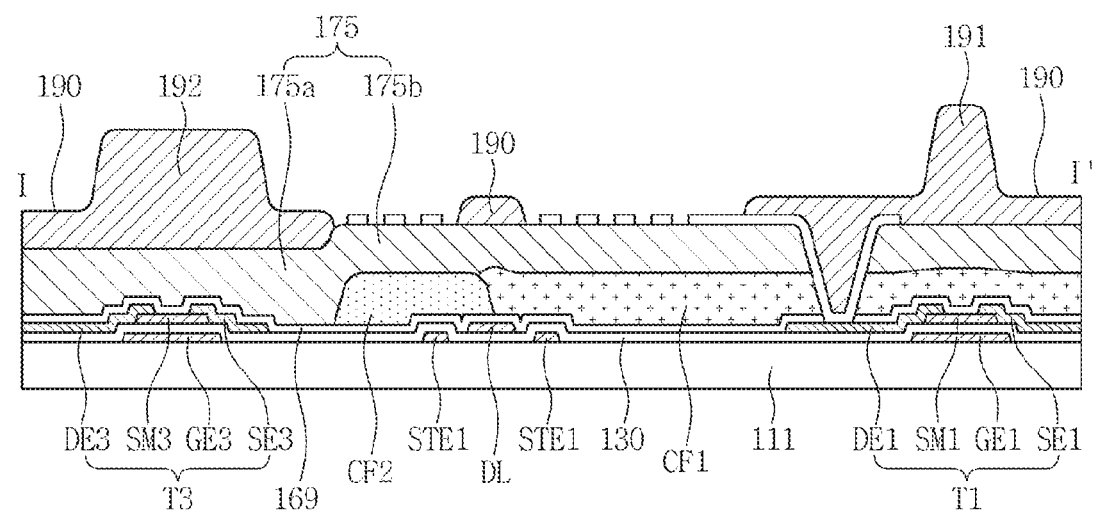

Referring to FIGS. 13F, 13G, and 13H, the display substrate 100 may be divided into four areas based on distribution of the second photosensitive composition 199.

In an exemplary embodiment, the display substrate 100 may be divided into an area of the first and second electrodes PE1 and PE2 in which the second photosensitive composition 199 is entirely removed, an area of the light blocking portion 190 in which the second photosensitive composition 199 is partially removed, an area of the sub-column spacer 192, and an area of the main column spacer 191, for example.

In the case that the passivation layer 175 does not have the concave portion 175a, a four-tone mask needs to be used to form an area having four different heights, for example. The four-tone mask has four areas each having different light transmittances from one another. In such an exemplary embodiment, a semi-transmissive pattern is disposed above an area to be provided with the sub-column spacer 192. The semi-transmissive pattern corresponding to the area to be provided with the sub-column spacer 192 may have a lower light transmittance than that of a transmissive pattern 520-1 corresponding to the area to be provided with the main column spacer 191 and may have a higher light transmittance than that of a semi-transmissive pattern 530 corresponding to the area to be provided with the light blocking portion 190. In the case that the four-tone mask is used, a difference among light exposure degrees in respective areas is relatively less distinct in an exposure process, and thus an error may occur in the pattern that is provided through light exposure.

In an exemplary embodiment, the light transmittance of the semi-transmissive pattern is about 50% or lower, for example, about 20% or lower. Accordingly, in the case that the sub-column spacer 192 is provided through light exposure using the semi-transmissive pattern, an amount of light transmission in the area to be provided with the sub-column spacer 192 is insufficient such that a process spread may occur in the exposure process. Thus, the plurality of sub-column spacers 192 may not have the uniform thickness, and may suffer a thickness spread.

However, the three-tone mask has three areas having different light transmittances such that a sufficiently large difference in light transmittance may be imparted among respective areas of the three-tone mask. Accordingly, in the case that the three-tone mask is used, a difference among light exposure degrees in respective areas is relatively distinct in an exposure process, and thus an error may be reduced in the pattern that is provided through the light exposure. According to an exemplary embodiment, an area to be provided with the sub-column spacer 192 is exposed at a light transmission degree of about 95% to about 100% such that a degree of pattern accuracy of the sub-column spacer 192 is excellent and a thickness spread may be reduced, for example.

In an exemplary embodiment, in the case that a sub-column spacer that is provided through light exposure using the four-tone mask may have a thickness spread of about 0.7 µm, the sub-column spacer 192 that is provided through light exposure using the three-tone mask may have a thickness spread of about 0.35 µm, for example.

In addition, a manufacturing cost of the four-tone mask having four different tones is greater than that of the three-tone mask. That is, as the three-tone mask has a greater difference among light transmittances of respective areas thereof, as compared to that of the four-tone mask, a manufacturing cost of the three-tone mask is relatively low as compared to that of the four-tone mask. In an exemplary embodiment, the manufacturing cost of the three-tone mask is about 50% of the manufacturing cost of the four-tone mask, for example.

Referring to FIG. 13H, the second photosensitive composition 199 that is exposed is developed by a developing solution and then cured such that the light blocking portion 190, the main column spacer 191, and the sub-column spacer 192 may be provided.

In the case the recessed portions 195a, 195b, 195c, and 195d (refer to FIG. 10) are defined around the main column spacer 191 or the sub-column spacer 192, an area to be provided with the main column spacer 191 or the sub-column spacer 192 is clearly defined, and thus a pattern collapse due to reflow may be prevented in the curing process of the light blocking material and a degree of pattern accuracy may be enhanced. In order to define the recessed portions 195a, 195b, 195c, and 195d, an additional pattern may further be included in the exposure mask 501.

Subsequently, the opposing substrate 200 (refer to FIGS. 5 and 6) is disposed above the light blocking portion 190, the main column spacer 191, and the sub-column spacer 192, and the liquid crystal layer LC (refer to FIGS. 5 and 6) is interposed between the display substrate 100 and the opposing substrate 200.

As set forth hereinabove, the main column spacer, the sub-column spacer, and the light blocking portion may be provided using an exposure mask that includes three patterns each having different transmittances from one another. Accordingly, a process spread that may occur when forming the main column spacer, the sub-column spacer, and the light blocking portion may be reduced, and a manufacturing cost of the exposure mask may be reduced.

From the foregoing, it will be appreciated that various embodiments in accordance with the invention have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. A display device comprising:
    a base substrate;
    a first color filter on the base substrate, the first color filter extending in a direction;
    a plurality of second color filters on the base substrate, the plurality of second color filters being adjacent to the first color filter;
    a passivation layer on the base substrate, the first color filter, and the plurality of second color filters;
    a light blocking portion on the passivation layer;
    a main column spacer protruding from the light blocking portion; and
    a sub-column spacer spaced apart from the main column spacer and protruding from the light blocking portion,
    wherein the main column spacer overlaps the first color filter, and
    the sub-column spacer is disposed between two of the plurality of second color filters which are adjacent to each other.

2. The display device as claimed in claim 1, wherein the passivation layer comprises:
    a convex portion above the first color filter and the plurality of second color filters; and
    a concave portion among the plurality of second color filters,
    wherein the sub-column spacer is disposed above the concave portion.

3. The display device as claimed in claim 1, wherein the main column spacer and the sub-column spacer have substantially the same thickness with respect to portions of a surface of the light blocking portion which are adjacent to the main column spacer and the sub-column spacer, respectively.

4. The display device as claimed in claim 1, wherein the main column spacer has a greater height than a height of the sub-column spacer with respect to a surface of the base substrate.

5. The display device as claimed in claim 1, wherein the light blocking portion comprises the same material as that included in the main column spacer and the sub-column spacer.

6. The display device as claimed in claim 1, wherein the sub-column spacer does not overlap the plurality of second color filters.

7. The display device as claimed in claim 1, further comprising:
    a gate line on the base substrate;
    a data line on the base substrate, the data line intersecting the gate line;
    a thin film transistor connected to the gate line and the data line; and
    a pixel electrode connected to the thin film transistor,
    wherein the passivation layer is disposed above the gate line, the data line, and the thin film transistor, and
    the pixel electrode is disposed above the passivation layer.

8. The display device as claimed in claim 7, wherein the first color filter overlaps the gate line, and
    the plurality of second color filters does not overlap the gate line.

9. The display device as claimed in claim 7, wherein the first color filter overlaps the data line, and
    the plurality of second color filters does not overlap the data line.

10. The display device as claimed in claim 7, wherein the first color filter overlaps the thin film transistor, and
    the plurality of second color filters does not overlap the thin film transistor.

11. The display device as claimed in claim 2, wherein the light blocking portion has a recessed portion being spaced apart from the sub-column spacer and defined in concave portion.

12. The display device as claimed in claim 1, further comprising:
    an opposing base substrate disposed to oppose the base substrate; and
    a liquid crystal layer between the base substrate and the opposing base substrate.

13. A method of manufacturing a display device, the method comprising:
    forming a first color filter and a plurality of second color filters on a base substrate;
    forming a passivation layer on the first color filter and the plurality of second color filters; and
    forming a light blocking portion, a main column spacer, and a sub-column spacer on the passivation layer,
    wherein the first color filter extends in a direction to be disposed on the base substrate,
    the plurality of second color filters is disposed on the base substrate to be adjacent to the first color filter,
    the main column spacer overlaps the first color filter, and
    the sub-column spacer is disposed between two of the plurality of second color filters which are adjacent to each other.

14. The method as claimed in claim 13, wherein the first color filter is unitary to continuously extend in the direction.

15. The method as claimed in claim 13, wherein the forming the light blocking portion, the main column spacer, and the sub-column spacer comprises:
   coating a photosensitive composition forming a light blocking portion on the passivation layer;
   disposing an exposure mask on the photosensitive composition and irradiating light to the photosensitive composition forming the light blocking portion through the exposure mask; and
   developing and curing the photosensitive composition forming the light blocking portion which is exposed,
   wherein the exposure mask comprises a transmissive pattern, a semi-transmissive pattern, and a blocking pattern.

16. The method as claimed in claim 15, wherein the transmissive pattern of the exposure mask is disposed above an area to be provided with the main column spacer and the sub-column spacer.

* * * * *